(12) United States Patent
Affleck et al.

(10) Patent No.: US 11,719,089 B2
(45) Date of Patent: Aug. 8, 2023

(54) ANALYSIS OF DRILLING SLURRY SOLIDS BY IMAGE PROCESSING

(71) Applicant: Saudi Arabian Oil Company, Dhahran (SA)

(72) Inventors: Michael Affleck, Aberdeenshire (GB); Arturo Magana Mora, Dhahran (SA); Chinthaka Pasan Gooneratne, Dhahran (SA); William Contreras Otalvora, Dhahran (SA); Pratyush Singh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 363 days.

(21) Appl. No.: 16/930,014

(22) Filed: Jul. 15, 2020

(65) Prior Publication Data

US 2022/0018241 A1   Jan. 20, 2022

(51) Int. Cl.
*E21B 47/002* (2012.01)
*E21B 21/06* (2006.01)
*E21B 49/00* (2006.01)
*G06N 3/02* (2006.01)
*G06F 18/24* (2023.01)

(52) U.S. Cl.
CPC ........ *E21B 47/0025* (2020.05); *E21B 21/066* (2013.01); *E21B 49/003* (2013.01); *G06F 18/24* (2023.01); *G06N 3/02* (2013.01); *E21B 21/06* (2013.01)

(58) Field of Classification Search
USPC .......................................................... 702/6
See application file for complete search history.

(56) References Cited

U.S. PATENT DOCUMENTS

| | | | |
|---|---|---|---|
| 891,957 | A | 6/1908 | Schubert |
| 2,110,913 | A | 3/1938 | Lowrey |
| 2,286,673 | A | 6/1942 | Douglas |
| 2,305,062 | A | 12/1942 | Church et al. |
| 2,344,120 | A | 3/1944 | Baker |
| 2,757,738 | A | 9/1948 | Ritchey |
| 2,509,608 | A | 5/1950 | Penfield |
| 2,688,369 | A | 9/1954 | Broyles |
| 2,690,897 | A | 10/1954 | Clark |
| 2,719,363 | A | 10/1955 | Richard et al. |

(Continued)

FOREIGN PATENT DOCUMENTS

| | | |
|---|---|---|
| CA | 2537585 | 8/2006 |
| CA | 2669721 | 7/2011 |

(Continued)

OTHER PUBLICATIONS

"Hole Cleaning," Petrowiki, retrieved on Jan. 25, 2019, 8 pages.

(Continued)

*Primary Examiner* — Paul D Lee
(74) *Attorney, Agent, or Firm* — Fish & Richardson P.C.

(57) ABSTRACT

Analysis of drilling slurry solids by image processing includes receiving images of a solid slurry including a mixture of wellbore drilling mud and solid objects found in the wellbore while drilling the wellbore through a subterranean zone. The solid objects include drill cuttings and non-drilled solids. By implementing image processing techniques on the images, the solids in the solid slurry are classified a drill cutting or as a non-drilled solid.

16 Claims, 8 Drawing Sheets

(56) References Cited

U.S. PATENT DOCUMENTS

| | | |
|---|---|---|
| 2,795,279 A | 6/1957 | Erich |
| 2,799,641 A | 7/1957 | Gordon |
| 2,805,045 A | 9/1957 | Goodwin |
| 2,822,150 A | 2/1958 | Muse et al. |
| 2,841,226 A | 7/1958 | Conrad et al. |
| 2,899,000 A | 8/1959 | Medders et al. |
| 2,927,775 A | 3/1960 | Hildebrandt |
| 3,016,244 A | 1/1962 | Friedrich et al. |
| 3,028,915 A | 4/1962 | Jennings |
| 3,087,552 A | 4/1963 | Graham |
| 3,102,599 A | 9/1963 | Hillburn |
| 3,103,975 A | 9/1963 | Hanson |
| 3,104,711 A | 9/1963 | Haagensen |
| 3,114,875 A | 12/1963 | Haagensen |
| 3,133,592 A | 5/1964 | Tomberlin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,211,220 A | 10/1965 | Erich |
| 3,220,478 A | 11/1965 | Kinzbach |
| 3,236,307 A | 2/1966 | Brown |
| 3,253,336 A | 5/1966 | Brown |
| 3,268,003 A | 8/1966 | Essary |
| 3,331,439 A | 7/1967 | Lawrence |
| 3,428,125 A | 2/1969 | Parker |
| 3,468,373 A | 9/1969 | Smith |
| 3,522,848 A | 8/1970 | New |
| 3,547,192 A | 12/1970 | Claridge et al. |
| 3,547,193 A | 12/1970 | Gill |
| 3,642,066 A | 2/1972 | Gill |
| 3,656,564 A | 4/1972 | Brown |
| 3,696,866 A | 10/1972 | Dryden |
| 3,839,791 A | 10/1974 | Feamster |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,064,211 A | 12/1977 | Wood |
| 4,084,637 A | 4/1978 | Todd |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,191,493 A | 3/1980 | Hansson et al. |
| 4,193,448 A | 3/1980 | Jearnbey |
| 4,193,451 A | 3/1980 | Dauphine |
| 4,196,329 A | 4/1980 | Rowland et al. |
| 4,199,025 A | 4/1980 | Carpenter |
| 4,265,307 A | 5/1981 | Elkins |
| RE30,738 E | 9/1981 | Bridges et al. |
| 4,301,865 A | 11/1981 | Kasevich et al. |
| 4,320,801 A | 3/1982 | Rowland et al. |
| 4,334,928 A | 6/1982 | Hara |
| 4,337,653 A | 7/1982 | Chauffe |
| 4,343,651 A | 8/1982 | Yazu et al. |
| 4,354,559 A | 10/1982 | Johnson |
| 4,373,581 A | 2/1983 | Toellner |
| 4,394,170 A | 7/1983 | Sawaoka et al. |
| 4,396,062 A | 8/1983 | Iskander |
| 4,412,585 A | 11/1983 | Bouck |
| 4,413,642 A | 11/1983 | Smith et al. |
| 4,449,585 A | 5/1984 | Bridges et al. |
| 4,457,365 A | 7/1984 | Kasevich et al. |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,557,327 A | 12/1985 | Kinley et al. |
| 4,576,231 A | 3/1986 | Dowling et al. |
| 4,583,589 A | 4/1986 | Kasevich |
| 4,592,423 A | 6/1986 | Savage et al. |
| 4,612,988 A | 9/1986 | Segalman |
| 4,620,593 A | 11/1986 | Haagensen |
| 4,636,934 A | 1/1987 | Schwendemann |
| 4,660,636 A | 4/1987 | Rundell et al. |
| 4,705,108 A | 11/1987 | Little et al. |
| 4,817,711 A | 4/1989 | Jearnbey |
| 5,012,863 A | 5/1991 | Springer |
| 5,018,580 A | 5/1991 | Skipper |
| 5,037,704 A | 8/1991 | Nakai et al. |
| 5,055,180 A | 10/1991 | Klaila |
| 5,068,819 A | 11/1991 | Misra et al. |
| 5,070,952 A | 12/1991 | Neff |
| 5,074,355 A | 12/1991 | Lennon |
| 5,082,054 A | 1/1992 | Kiamanesh |
| 5,092,056 A | 3/1992 | Deaton |
| 5,107,705 A | 4/1992 | Wraight et al. |
| 5,107,931 A | 4/1992 | Valka et al. |
| 5,228,518 A | 7/1993 | Wilson et al. |
| 5,236,039 A | 8/1993 | Edelstein et al. |
| 5,278,550 A | 1/1994 | Rhein-Knudsen et al. |
| 5,388,648 A | 2/1995 | Jordan, Jr. |
| 5,490,598 A | 2/1996 | Adams |
| 5,501,248 A | 3/1996 | Kiest, Jr. |
| 5,690,826 A | 11/1997 | Cravello |
| 5,803,666 A | 9/1998 | Keller |
| 5,813,480 A | 9/1998 | Zaleski, Jr. et al. |
| 5,853,049 A | 12/1998 | Keller |
| 5,890,540 A | 4/1999 | Pia et al. |
| 5,899,274 A | 5/1999 | Frauenfeld et al. |
| 5,947,213 A | 9/1999 | Angle |
| 5,955,666 A | 9/1999 | Mullins |
| 5,958,236 A | 9/1999 | Bakula |
| RE36,362 E | 11/1999 | Jackson |
| 6,012,526 A | 1/2000 | Jennings et al. |
| 6,032,742 A | 3/2000 | Tomlin et al. |
| 6,041,860 A | 3/2000 | Nazzal et al. |
| 6,096,436 A | 8/2000 | Inspektor |
| 6,170,531 B1 | 1/2001 | Jung et al. |
| 6,173,795 B1 | 1/2001 | McGarian et al. |
| 6,189,611 B1 | 2/2001 | Kasevich |
| 6,254,844 B1 | 7/2001 | Takeuchi et al. |
| 6,268,726 B1 | 7/2001 | Prammer |
| 6,269,953 B1 | 8/2001 | Seyffert et al. |
| 6,290,068 B1 | 9/2001 | Adams et al. |
| 6,305,471 B1 | 10/2001 | Milloy |
| 6,325,216 B1 | 12/2001 | Seyffert et al. |
| 6,328,111 B1 | 12/2001 | Bearden et al. |
| 6,354,371 B1 | 3/2002 | O'Blanc |
| 6,371,302 B1 | 4/2002 | Adams et al. |
| 6,413,399 B1 | 7/2002 | Kasevich |
| 6,443,228 B1 | 9/2002 | Aronstam |
| 6,454,099 B1 | 9/2002 | Adams et al. |
| 6,510,947 B1 | 1/2003 | Schulte et al. |
| 6,534,980 B2 | 2/2003 | Toufaily et al. |
| 6,544,411 B2 | 4/2003 | Varandaraj |
| 6,561,269 B1 | 5/2003 | Brown et al. |
| 6,571,877 B1 | 6/2003 | Van Bilderbeek |
| 6,607,080 B2 | 8/2003 | Winkler et al. |
| 6,612,384 B1 | 9/2003 | Singh et al. |
| 6,623,850 B2 | 9/2003 | Kukino et al. |
| 6,629,610 B1 | 10/2003 | Adams et al. |
| 6,637,092 B1 | 10/2003 | Menzel |
| 6,678,616 B1 | 1/2004 | Winkler et al. |
| 6,722,504 B2 | 4/2004 | Schulte et al. |
| 6,761,230 B2 | 7/2004 | Cross et al. |
| 6,814,141 B2 | 11/2004 | Huh et al. |
| 6,827,145 B2 | 12/2004 | Fotland |
| 6,845,818 B2 | 1/2005 | Tutuncu et al. |

(56) References Cited

U.S. PATENT DOCUMENTS

| | | |
|---|---|---|
| 6,850,068 B2 | 2/2005 | Chernali et al. |
| 6,895,678 B2 | 5/2005 | Ash et al. |
| 6,912,177 B2 | 6/2005 | Smith |
| 6,971,265 B1 | 12/2005 | Sheppard et al. |
| 6,993,432 B2 | 1/2006 | Jenkins et al. |
| 7,000,777 B2 | 2/2006 | Adams et al. |
| 7,013,992 B2 | 3/2006 | Tessari et al. |
| 7,048,051 B2 | 5/2006 | McQueen |
| 7,063,155 B2 | 6/2006 | Ruttley |
| 7,091,460 B2 | 8/2006 | Kinzer |
| 7,109,457 B2 | 9/2006 | Kinzer |
| 7,115,847 B2 | 10/2006 | Kinzer |
| 7,216,767 B2 | 5/2007 | Schulte et al. |
| 7,312,428 B2 | 12/2007 | Kinzer |
| 7,322,776 B2 | 1/2008 | Webb et al. |
| 7,331,385 B2 | 2/2008 | Symington |
| 7,376,514 B2 | 5/2008 | Habashy et al. |
| 7,387,174 B2 | 6/2008 | Lurie |
| 7,445,041 B2 | 11/2008 | O'Brien |
| 7,455,117 B1 | 11/2008 | Hall et al. |
| 7,461,693 B2 | 12/2008 | Considine et al. |
| 7,484,561 B2 | 2/2009 | Bridges |
| 7,539,548 B2 | 5/2009 | Dhawan |
| 7,562,708 B2 | 7/2009 | Cogliandro et al. |
| 7,629,497 B2 | 12/2009 | Pringle |
| 7,631,691 B2 | 12/2009 | Symington et al. |
| 7,650,269 B2 | 1/2010 | Rodney |
| 7,677,673 B2 | 3/2010 | Tranquilla et al. |
| 7,730,625 B2 | 6/2010 | Blake |
| 7,951,482 B2 | 5/2011 | Ichinose et al. |
| 7,980,392 B2 | 7/2011 | Varco |
| 8,237,444 B2 | 8/2012 | Simon |
| 8,245,792 B2 | 8/2012 | Trinh et al. |
| 8,275,549 B2 | 9/2012 | Sabag et al. |
| 8,484,858 B2 | 7/2013 | Brannigan et al. |
| 8,511,404 B2 | 8/2013 | Rasheed |
| 8,526,171 B2 | 9/2013 | Wu et al. |
| 8,528,668 B2 | 9/2013 | Rasheed |
| 8,567,491 B2 | 10/2013 | Lurie |
| 8,794,062 B2 | 8/2014 | DiFoggio et al. |
| 8,812,236 B1 * | 8/2014 | Freeman ............... E21B 21/08 73/152.43 |
| 8,884,624 B2 | 11/2014 | Homan et al. |
| 8,925,213 B2 | 1/2015 | Sallwasser |
| 8,960,215 B2 | 2/2015 | Cui et al. |
| 9,109,429 B2 | 8/2015 | Xu et al. |
| 9,217,323 B2 | 12/2015 | Clark |
| 9,222,350 B2 | 12/2015 | Vaughn et al. |
| 9,250,339 B2 | 2/2016 | Ramirez |
| 9,353,589 B2 | 5/2016 | Hekelaar |
| 9,394,782 B2 | 7/2016 | DiGiovanni et al. |
| 9,435,159 B2 | 9/2016 | Scott |
| 9,464,487 B1 | 10/2016 | Zurn |
| 9,470,059 B2 | 10/2016 | Zhou |
| 9,494,032 B2 | 11/2016 | Roberson et al. |
| 9,528,366 B2 | 12/2016 | Selman et al. |
| 9,562,987 B2 | 2/2017 | Guner et al. |
| 9,617,815 B2 | 4/2017 | Schwartze et al. |
| 9,664,011 B2 | 5/2017 | Kruspe et al. |
| 9,702,211 B2 | 7/2017 | Tinnen |
| 9,731,471 B2 | 8/2017 | Schaedler et al. |
| 9,739,141 B2 | 8/2017 | Zeng et al. |
| 10,000,983 B2 | 6/2018 | Jackson et al. |
| 10,174,577 B2 | 1/2019 | Leuchtenberg et al. |
| 10,233,372 B2 | 3/2019 | Ramasamy et al. |
| 10,394,193 B2 | 8/2019 | Li et al. |
| 10,544,640 B2 | 1/2020 | Hekelaar et al. |
| 2003/0159776 A1 | 8/2003 | Graham |
| 2003/0230526 A1 | 12/2003 | Okabayshi et al. |
| 2004/0182574 A1 | 9/2004 | Sarmad et al. |
| 2004/0256103 A1 | 12/2004 | Batarseh |
| 2005/0092523 A1 | 5/2005 | McCaskill et al. |
| 2005/0259512 A1 | 11/2005 | Mandal |
| 2006/0016592 A1 | 1/2006 | Wu |
| 2006/0106541 A1 | 5/2006 | Hassan et al. |
| 2006/0144620 A1 | 7/2006 | Cooper |
| 2006/0185843 A1 | 8/2006 | Smith |
| 2006/0249307 A1 | 11/2006 | Ritter |
| 2007/0131591 A1 | 6/2007 | Pringle |
| 2007/0137852 A1 | 6/2007 | Considine et al. |
| 2007/0175633 A1 | 8/2007 | Kosmala |
| 2007/0187089 A1 | 8/2007 | Bridges |
| 2007/0204994 A1 | 9/2007 | Wimmersperg |
| 2007/0289736 A1 | 12/2007 | Keari et al. |
| 2008/0007421 A1 | 1/2008 | Liu et al. |
| 2008/0047337 A1 | 2/2008 | Chemali et al. |
| 2008/0173480 A1 | 7/2008 | Annaiyappa et al. |
| 2008/0190822 A1 | 8/2008 | Young |
| 2008/0308282 A1 | 12/2008 | Standridge et al. |
| 2009/0153354 A1 | 6/2009 | Daussin |
| 2009/0164125 A1 | 6/2009 | Bordakov et al. |
| 2009/0178809 A1 | 7/2009 | Jeffryes et al. |
| 2009/0259446 A1 | 10/2009 | Zhang et al. |
| 2010/0089583 A1 | 4/2010 | Xu et al. |
| 2010/0276209 A1 | 11/2010 | Yong et al. |
| 2010/0282511 A1 | 11/2010 | Maranuk |
| 2011/0011576 A1 | 1/2011 | Cavender et al. |
| 2011/0120732 A1 | 5/2011 | Lurie |
| 2012/0012319 A1 | 1/2012 | Dennis |
| 2012/0111578 A1 | 5/2012 | Tverlid |
| 2012/0132418 A1 | 5/2012 | McClung |
| 2012/0152543 A1 | 6/2012 | Davis |
| 2012/0173196 A1 | 7/2012 | Miszewski |
| 2012/0186817 A1 | 7/2012 | Gibson et al. |
| 2012/0222854 A1 | 9/2012 | McClung, III |
| 2012/0227983 A1 | 9/2012 | Lymberopoulous et al. |
| 2012/0273187 A1 | 11/2012 | Hall |
| 2013/0008653 A1 | 1/2013 | Schultz et al. |
| 2013/0008671 A1 | 1/2013 | Booth |
| 2013/0025943 A1 | 1/2013 | Kumar |
| 2013/0076525 A1 | 3/2013 | Vu et al. |
| 2013/0125642 A1 | 5/2013 | Parfitt |
| 2013/0126164 A1 | 5/2013 | Sweatman et al. |
| 2013/0146359 A1 | 6/2013 | Koederitz |
| 2013/0213637 A1 | 8/2013 | Keari |
| 2013/0255936 A1 | 10/2013 | Statoilydro et al. |
| 2014/0083771 A1 | 3/2014 | Clark |
| 2014/0183143 A1 | 7/2014 | Cady et al. |
| 2014/0231075 A1 | 8/2014 | Springett et al. |
| 2014/0231147 A1 | 8/2014 | Bozso et al. |
| 2014/0238658 A1 | 8/2014 | Wilson et al. |
| 2014/0246235 A1 | 9/2014 | Yao |
| 2014/0251894 A1 | 9/2014 | Larson et al. |
| 2014/0278111 A1 | 9/2014 | Gerrie et al. |
| 2014/0291023 A1 | 10/2014 | Edbury |
| 2014/0333754 A1 | 11/2014 | Graves et al. |
| 2014/0360778 A1 | 12/2014 | Batarseh |
| 2014/0375468 A1 | 12/2014 | Wilkinson et al. |
| 2015/0020908 A1 | 1/2015 | Warren |
| 2015/0021240 A1 | 1/2015 | Wardell et al. |
| 2015/0083422 A1 | 3/2015 | Pritchard |
| 2015/0091737 A1 | 4/2015 | Richardson et al. |
| 2015/0101864 A1 | 4/2015 | May |
| 2015/0159467 A1 | 6/2015 | Hartman et al. |
| 2015/0211362 A1 | 7/2015 | Rogers |
| 2015/0267500 A1 | 9/2015 | Van Dogen |
| 2015/0290878 A1 | 10/2015 | Houben et al. |
| 2015/0300151 A1 | 10/2015 | Mohaghegh |
| 2016/0053572 A1 | 2/2016 | Snoswell |
| 2016/0053604 A1 | 2/2016 | Abbassian |
| 2016/0076357 A1 | 3/2016 | Hbaieb |
| 2016/0115783 A1 | 4/2016 | Zeng et al. |
| 2016/0130928 A1 | 5/2016 | Torrione |
| 2016/0153240 A1 | 6/2016 | Braga et al. |
| 2016/0160106 A1 | 6/2016 | Jamison et al. |
| 2016/0237810 A1 | 8/2016 | Beaman et al. |
| 2016/0247316 A1 | 8/2016 | Whalley et al. |
| 2016/0356125 A1 | 12/2016 | Bello et al. |
| 2017/0056928 A1 * | 3/2017 | Torrione ............... B07B 1/46 |
| 2017/0058620 A1 | 3/2017 | Torrione |
| 2017/0089153 A1 | 3/2017 | Teodorescu |
| 2017/0161885 A1 | 6/2017 | Parmeshwar et al. |
| 2017/0234104 A1 | 8/2017 | James |
| 2017/0292376 A1 | 10/2017 | Kumar et al. |

(56) References Cited

U.S. PATENT DOCUMENTS

| | | | |
|---|---|---|---|
| 2017/0314335 A1 | 11/2017 | Kosonde et al. | |
| 2017/0328196 A1 | 11/2017 | Shi et al. | |
| 2017/0328197 A1 | 11/2017 | Shi et al. | |
| 2017/0342776 A1 | 11/2017 | Bullock et al. | |
| 2017/0350201 A1 | 12/2017 | Shi et al. | |
| 2017/0350241 A1 | 12/2017 | Shi | |
| 2018/0010030 A1 | 1/2018 | Ramasamy et al. | |
| 2018/0010419 A1 | 1/2018 | Livescu et al. | |
| 2018/0171772 A1 | 6/2018 | Rodney | |
| 2018/0187498 A1 | 7/2018 | Soto et al. | |
| 2018/0200647 A1* | 7/2018 | Smith | B01D 21/302 |
| 2018/0265416 A1 | 9/2018 | Ishida et al. | |
| 2018/0326679 A1 | 11/2018 | Weisenberg et al. | |
| 2019/0049054 A1 | 2/2019 | Gunnarsson et al. | |
| 2019/0101872 A1 | 4/2019 | Li | |
| 2019/0227499 A1 | 7/2019 | Li et al. | |
| 2019/0257180 A1 | 8/2019 | Kriesels et al. | |
| 2020/0032638 A1 | 1/2020 | Ezzeddine | |
| 2020/0157929 A1 | 5/2020 | Torrione | |
| 2021/0319257 A1* | 10/2021 | Francois | G06V 10/774 |
| 2021/0379511 A1* | 12/2021 | Scott | B01D 33/0376 |

FOREIGN PATENT DOCUMENTS

| | | |
|---|---|---|
| CN | 200989202 | 12/2007 |
| CN | 203232293 | 10/2013 |
| CN | 204627586 | 9/2015 |
| CN | 107208478 | 9/2017 |
| CN | 107462222 | 12/2017 |
| CN | 110571475 | 12/2019 |
| EP | 2317068 | 5/2011 |
| EP | 2574722 | 4/2013 |
| EP | 2737173 | 6/2014 |
| GB | 2124855 | 2/1984 |
| GB | 2357305 | 6/2001 |
| GB | 2399515 | 9/2004 |
| GB | 2422125 | 7/2006 |
| GB | 2532967 | 6/2016 |
| JP | 2009067609 | 4/2009 |
| JP | 4275896 | 6/2009 |
| JP | 5013156 | 8/2012 |
| NO | 343139 | 11/2018 |
| NO | 20161842 | 5/2019 |
| RU | 2282708 | 8/2006 |
| WO | WO 1995035429 | 12/1995 |
| WO | WO 2000025942 | 5/2000 |
| WO | WO 2000031374 | 6/2000 |
| WO | WO 2001042622 | 6/2001 |
| WO | WO 2002068793 | 9/2002 |
| WO | WO 2004042185 | 5/2004 |
| WO | WO 2007049026 | 5/2007 |
| WO | WO 2007070305 | 6/2007 |
| WO | WO 2008146017 | 12/2008 |
| WO | WO 2009020889 | 2/2009 |
| WO | WO 2009113895 | 9/2009 |
| WO | WO 2010105177 | 9/2010 |
| WO | WO 2011038170 | 3/2011 |
| WO | WO 2011042622 | 6/2011 |
| WO | WO 2012007407 | 1/2012 |
| WO | WO 2013016095 | 1/2013 |
| WO | WO 2013148510 | 10/2013 |
| WO | WO 2015095155 | 6/2015 |
| WO | WO 2016178005 | 11/2016 |
| WO | WO 2017011078 | 1/2017 |
| WO | WO 2017132297 | 8/2017 |
| WO | WO 2018169991 | 9/2018 |
| WO | WO 2019040091 | 2/2019 |
| WO | WO 2019055240 | 3/2019 |
| WO | WO 2019089926 | 5/2019 |
| WO | WO 2019108931 | 6/2019 |
| WO | WO 2019117857 | 6/2019 |
| WO | WO 2019160859 | 8/2019 |
| WO | WO 2019169067 | 9/2019 |
| WO | WO 2019236288 | 12/2019 |
| WO | WO 2019246263 | 12/2019 |

OTHER PUBLICATIONS

"IADC Dull Grading for PDC Drill Bits," Beste Bit, SPE/IADC 23939, 1992, 52 pages.

Akersolutions, "Aker MH CCTC Improving Safety," Aker Solutions, Jan. 2008, 12 pages.

Anwar et al., "Fog computing: an overview of big IoT data analytics," Wireless communications and mobile computing, May 2018, 2018: 1-22.

Artymiuk et al., "The new drilling control and monitoring system," Acta Montanistica Slovaca, Sep. 2004, 9(3): 145-151.

Ashby et al., "Coiled Tubing Conveyed Video Camera and Multi-Arm Caliper Liner Damage Diagnostics Post Plug and Perf Frac," Society of Petroleum Engineers, SPE-172622-MS, Mar. 2015, pp. 12.

Bilal et al., "Potentials, trends, and prospects in edge technologies: Fog, cloudlet, mobile edge, and micro data centers," Computer Networks, Elsevier, Oct. 2017, 130: 94-120.

Carpenter, "Advancing Deepwater Kick Detection", JPT, vol. 68, Issue 5, May 2016, 2 pages.

Commer et al., "New advances in three-dimensional controlled-source electromagnetic inversion," Geophys. J. Int., 2008, 172: 513-535.

Dickens et al., "An LED array-based light induced fluorescence sensor for real-time process and field monitoring," Sensors and Actuators B: Chemical, Elsevier, Apr. 2011, 158(1): 35-42.

Dong et al., "Dual Substitution and Spark Plasma Sintering to Improve Ionic Conductivity of Garnet Li7La3Zr2O12," Nanomaterials, 9, 721, 2019, 10 pages.

downholediagnostic.com [online] "Acoustic Fluid Level Surveys," retrieved from URL <https://www.downholediagnostic.com/fluid-level> retrieved on Mar. 27, 2020, available on or before 2018, 13 pages.

edition.cnn.com [online], "Revolutionary gel is five times stronger than steel," retrieved from URL <https://edition.cnn.com/style/article/hydrogel-steel-japan/index.html>, retrieved on Apr. 2, 2020, available on or before Jul. 16, 2017, 6 pages.

Gemmeke and Ruiter, "3D ultrasound computer tomography for medical imagining," Nuclear Instruments and Methods in Physics Research A 580, Oct. 1, 2007, 9 pages.

Halliburton, "Drill Bits and Services Solutions Catalogs," retrieved from URL: <https://www.halliburton.com/content/dam/ps/public/sdbs/sdbs_contents/Books_and_Catalogs/web/DBS-Solution.pdf> on Sep. 26, 2019, Copyright 2014, 64 pages.

Hopkin, "Factor Affecting Cuttings Removal during Rotary Drilling," Journal of Petroleum Technology 19.06, Jun. 1967, 8 pages.

Ji et al., "Submicron Sized Nb Doped Lithium Garnet for High Ionic Conductivity Solid Electrolyte and Performance of All Solid-State Lithium Battery," doi:10.20944/preprints201912.0307.v1, Dec. 2019, 10 pages.

Johnson et al., "Advanced Deepwater Kick Detection," IADC/SPE 167990, presented at the 2014 IADC/SPE Drilling Conference and Exhibition, Mar. 4-6, 2014, 10 pages.

Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.

King et al., "Atomic layer deposition of TiO2 films on particles in a fluidized bed reactor," Power Technology, vol. 183, Issue 3, Apr. 2008, 8 pages.

Li et al., 3D Printed Hybrid Electrodes for Lithium-ion Batteries, Missouri University of Science and Technology, Washington State University; ECS Transactions, 77 (11) 1209-1218 (2017), 11 pages.

Liu et al., "Flow visualization and measurement in flow field of a torque converter," Mechanic automation and control Engineering, Second International Conference on IEEE, Jul. 15, 2011, 1329-1331.

Liu et al., "Superstrong micro-grained poly crystalline diamond compact through work hardening under high pressure," Appl. Phys. Lett. Feb. 2018, 112: 6 pages.

(56) References Cited

OTHER PUBLICATIONS

Luo et al., "Simple Charts to Determine Hole Cleaning Requirements in Deviated Wells," IADC/SPE 27486, SPE/IADC Drilling Conference, Society of Petroleum Engineers, Feb. 15-18, 1994, 7 pages.
Maurer, "The Perfect Cleaning Theory of Rotary Drilling," Journal of Petroleum Technology 14.11, 1962, 5 pages.
nature.com [online], "Mechanical Behavior of a Soft Hydrogel Reinforced with Three-Dimensional Printed Microfibre Scaffolds," retrieved from URL <https://www.nature.com/articles/s41598-018-19502-y>, retrieved on Apr. 2, 2020, available on or before Jan. 19, 2018, 47 pages.
Nuth, "Smart oil field distributed computing," The Industrial Ethernet Book, Nov. 2014, 85(14): 1-3.
Olver, "Compact Antenna Test Ranges," Seventh International Conference on Antennas and Propagation IEEE, Apr. 15-18, 1991, 10 pages.
Paiaman et al., "Effect of Drilling Fluid Properties on Rate Penetration," Nafta vol. 60, No. 3, 2009, 6 pages.
Parini et al., "Chapter 3: Antenna measurements," in Theory and Practice of Modern Antenna Range Measurements, IET editorial, 2014, 30 pages.
petrowiki.org [online], "Kicks," Petrowiki, available on or before Jun. 26, 2015, retrieved on Jan. 24, 2018, retrieved from URL <https://petrowiki.org/Kicks>, 6 pages.
Ranjbar, "Cutting Transport in Inclined and Horizontal Wellbore," University of Stavanger, Faculty of Science and Technology, Master's Thesis, Jul. 6, 2010, 137 pages.
Rasi, "Hold Cleaning in Large, High-Angle Wellbores," SPE/IADC Drilling Conference, Society of Petroleum Engineers, Feb. 15-18, 1994, 12 pages.
rigzone.com [online], "How does Well Control Work?" Rigzone, available on or before 1999, retrieved on Jan. 24, 2019, retrieved from URL <https://www.rigzone.com/training/insight.asp?insight_id=304&c_id>, 5 pages.
Robinson and Morgan, "Effect of Hole Cleaning on Drilling Rate Performance," Paper Aade-04-Df-Ho-42, AADE 2004 Drilling Fluids Conference, Houston, Texas, Apr. 6-7, 2004, 7 pages.
Robinson, "Economic Consequences of Poor Solids and Control," AADE 2006 Fluids Conference and Houston, Texas, Apr. 11-12, 2006, 9 pages.
Ruiter et al., "3D ultrasound computer tomography of the breast: A new era?" European Journal of Radiology 81S1, Sep. 2012, 2 pages.
sageoiltools.com [online] "Fluid Level & Dynamometer Instruments for Analysis due Optimization of Oil and Gas Wells," retrieved from URL <http://www.sageoiltools.com/>, retrieved on Mar. 27, 2020, available on or before 2019, 3 pages.
Schlumberger, "First Rigless ESP Retrieval and Replacement with Slickline, Offshore Congo: Zeitecs Shuttle System Eliminates Need to Mobilize a Workover Rig," slb.com/zeitecs, 2016, 1 page.
Schlumberger, "The Lifting Business," Offshore Engineer, Mar. 2017, 1 page.
Schlumberger, "Zeitecs Shuttle System Decreases ESP Replacement Time by 87%: Customer ESP riglessly retrieved in less than 2 days on coiled tubing," slb.com/zeitecs, 2015, 1 page.
Schlumberger, "Zeitecs Shuttle System Reduces Deferred Production Even Before ESP is Commissioned, Offshore Africa: Third Party ESP developed fault during installation and was retrieved on rods, enabling operator to continue running tubing without waiting on replacement," slb.com/zeitecs, 2016, 2 pages.
Schlumberger, "Zeitecs Shuttle: Rigless ESP replacement system," Brochure, 8 pages.
Schlumberger, "Zeitecs Shuttle: Rigless ESP replacement system," Schlumberger, 2017, 2 pages.
Sifferman et al., "Drilling cutting transport in full scale vertical annuli," Journal of Petroleum Technology 26.11, 48th Annual Fall Meeting of the Society of Petroleum Engineers of AIME, Las Vegas, Sep. 30-Oct. 3, 1973, 12 pages.
slb.com' [online] "Technical Paper: ESP Retrievable Technology: A Solution to Enhance ESP Production While Minimizing Costs," SPE 156189 presented in 2012, retrieved from URL <http://www.slb.com/resources/technical_papers/artificial_lift/156189.aspx>, retrieved on Nov. 2, 2018, 1 pages.
slb.com' [online], "Zeitecs Shuttle Rigless ESP Replacement System," retrieved from URL <http://www.slb.com/services/production/artificial_lift/submersible/zeitecs-shuttle.aspx?t=3>, available on or before May 31, 2017, retrieved on Nov. 2, 2018, 3 pages.
Sulzer Metco, "An Introduction to Thermal Spray," Issue 4, 2013, 24 pages.
Unegbu Celestine Tobenna, "Hole Cleaning Hydraulics," Universitetet o Stavanger, Faculty of Science and Technology, Master's Thesis, Jun. 15, 2010, 75 pages.
Wei et al., "The Fabrication of All-Solid-State Lithium-Ion Batteries via Spark Plasma Sintering," Metals, 7, 372, 2017, 9 pages.
wikipedia.org [online] "Optical Flowmeters," retrieved from URL <https://en.wikipedia.org/wiki/Flow_measurement#Optical_flowmeters>, retrieved on Mar. 27, 2020, available on or before Jan. 2020, 1 page.
wikipedia.org [online] "Ultrasonic Flow Meter," retrieved from URL <https://en.wikipedia.org/wiki/Ultrasonic_flow_meter> retrieved on Mar. 27, 2020, available on or before Sep. 2019, 3 pages.
wikipedia.org [online], "Surface roughness," retrieved from URL <https://en.wikipedia.org/wiki/Surface_roughness> retrieved on Apr. 2, 2020, available on or before Oct. 2017, 6 pages.
Williams and Bruce, "Carrying Capacity of Drilling Muds," Journal of Petroleum Technology, 3.04, vol. 192, 1951, 10 pages.
Xia et al., "A Cutting Concentration Model of a Vertical Wellbore Annulus in Deep-water Drilling Operation and its Application," Applied Mechanics and Materials, vol. 101-102, Sep. 27, 2011, 5 pages.
Xue et al., "Spark plasma sintering plus heat-treatment of Ta-doped Li7La3Zr2O12 solid electrolyte and its ionic conductivity," Mater. Res. Express 7 (2020) 025518, 8 pages.
Zhan et al. "Effect of β-to-α Phase Transformation on the Microstructural Development and Mechanical Properties of Fine-Grained Silicon Carbide Ceramics." Journal of the American Ceramic Society 84.5, May 2001, 6 pages.
Zhan et al. "Single-wall carbon nanotubes as attractive toughening agents in alumina-based nanocomposites." Nature Materials 2.1, Jan. 2003, 6 pages.
Zhan et al., "Atomic Layer Deposition on Bulk Quantities of Surfactant Modified Single-Walled Carbon Nanotubes," Journal of American Ceramic Society, vol. 91, Issue 3, Mar. 2008, 5 pages.
Zhang et al, "Increasing Polypropylene High Temperature Stability by Blending Polypropylene-Bonded Hindered Phenol Antioxidant," Macromolecules, 51(5), pp. 1927-1936, 2018, 10 pages.
Zhu et al., "Spark Plasma Sintering of Lithium Aluminum Germanium Phosphate Solid Electrolyte and its Electrochemical Properties," University of British Columbia; Nanomaterials, 9, 1086, 2019, 10 pages.
PCT International Search Report and Written Opinion in International Appln. No. PCT/US2021/041753, dated Nov. 5, 2021, 15 pages.
Guilherme et al., "Petroleum well drilling monitoring through cutting image analysis and artificial intelligence techniques," Engineering Applications of Artificial Intelligence, Feb. 2011, 201-207.

\* cited by examiner

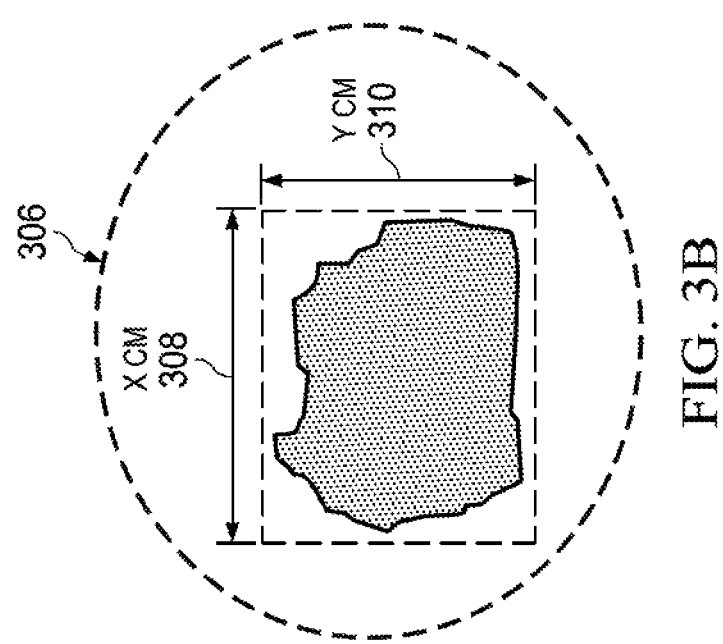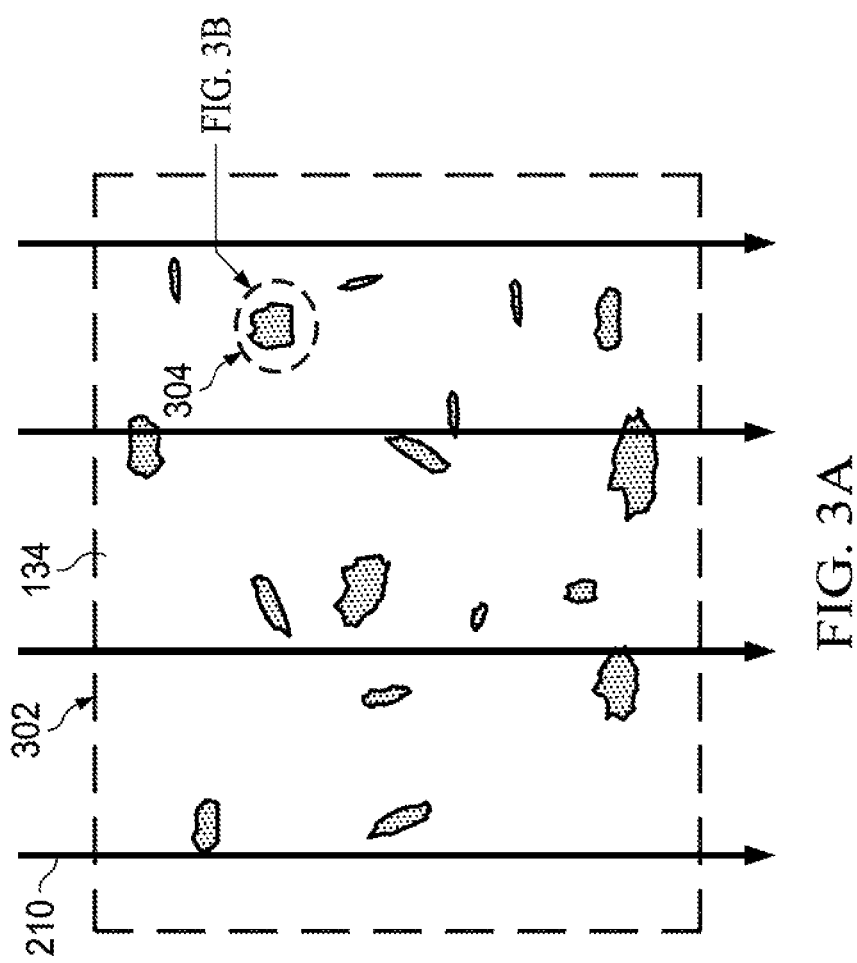

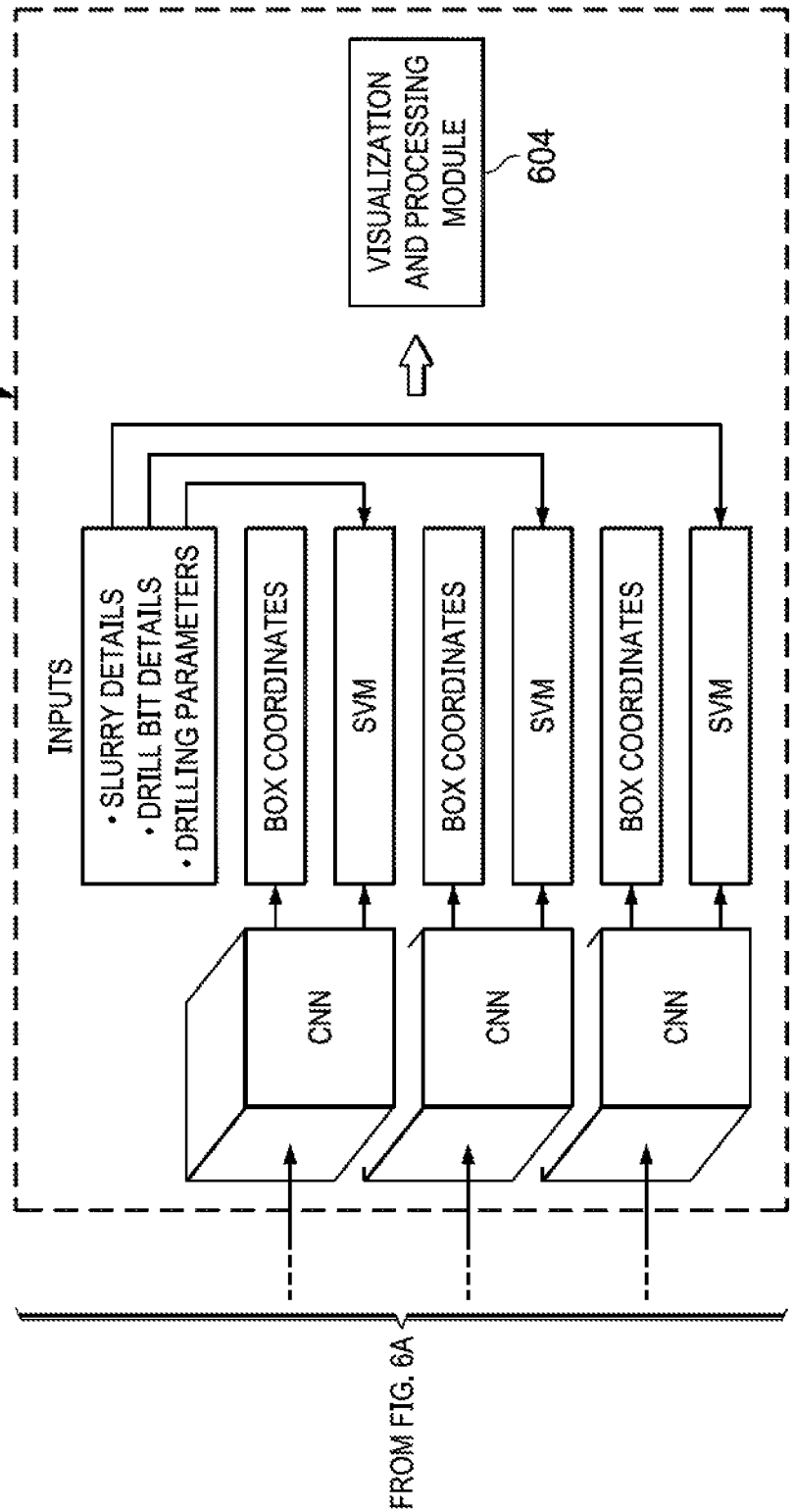

ANALYSIS OF DRILLING SLURRY SOLIDS BY IMAGE PROCESSING

TECHNICAL FIELD

This disclosure relates to wellbores, particularly, to drilling wellbores.

BACKGROUND

Hydrocarbons trapped in subsurface reservoirs can be raised to the surface of the Earth (that is, produced) through wellbores formed from the surface to the subsurface reservoirs. Wellbore drilling systems are used to drill wellbores through a subterranean zone (for example, a formation, a portion of a formation or multiple formations) to the subsurface reservoir. At a high level, the wellbore drilling system includes a drill bit connected to an end of a drill string. The drill string is rotated and weight is applied on the drill bit to drill through the subterranean zone. Wellbore drilling fluid (also known as drilling mud) is flowed in a downhole direction through the drill string. The drilling fluid exits the drill bit through ports defined in the drill bit and flows in an uphole direction through an annulus defined by an outer surface of the drill string and an inner wall of the wellbore. As the drilling fluid flows towards the surface, it carries any cuttings and debris released into the wellbore due to and during the drilling. The cuttings and debris are released from the subterranean zone as the drill bit breaks the rock while penetrating the subterranean zone. When mixed with the drilling fluid, the cuttings and debris form a solid slurry that flows to the surface. At the surface, the cuttings and debris are filtered and the wellbore drilling fluid can be recirculated into the wellbore to continue drilling. The cuttings and debris carried to the surface by the drilling fluid provide useful information, among other things, about the wellbore being formed and the drilling process.

SUMMARY

This specification describes technologies relating to the analysis of the solid slurry, specifically, of cuttings, debris and other foreign objects released during wellbore drilling, by image processing.

Certain aspects of the subject matter described here can be implemented as a system that includes a digital imaging device and a computer system. The digital imaging device is mounted to a non-vibrating member of a shale shaker of a wellbore drilling assembly. The shale shaker is positioned at a surface of the Earth adjacent a wellbore and is configured to receive a solid slurry that includes a mixture of wellbore drilling mud and solid objects found in the wellbore while drilling the wellbore through a subterranean zone. The solid objects include drill cuttings and non-drilled solids. The digital imaging device is oriented to face a portion of the shale shaker that receives the solid slurry. The digital imaging device is configured to capture digital images of the solid objects while the solid slurry is received by the shale shaker. The computer system is operatively coupled to the digital imaging device. The computer system includes one or more processors and a computer-readable medium storing instructions executable by the one or more processors to perform operations. The computer system receives the images captured by the digital imaging device. By implementing image processing techniques on the images, the computer system classifies a first solid object captured in a first image as a drill cutting and a second solid object captured in a second image as a non-drilled solid.

An aspect combinable with any other aspect includes the following features. An image of a solid object includes multiple particles, including particles representing the solid object in a first color and particles representing the remaining portions of the image in a second color different from the first. To implement the image processing techniques, the computer system can perform operations including counting a number of particles in the image. The computer system identifies the particles representing the solid object. The particles representing the solid object define an ADR representing dimensions of the solid object. The computer system determines a long axis of the area and a short axis of the area, the short axis being perpendicular to the long axis. The computer system determines the dimensions of the solid object based, in part, on a length of the long axis and a length of the short axis.

An aspect combinable with any other aspect includes the following features. The computer system is configured to perform operations including storing dimensions of known drill cuttings and known non-drilled solids. The computer system compares the dimensions of the solid object with the store dimensions and identifies the solid object as a drill cutting or a non-drilled solid based on a result of the comparing.

An aspect combinable with any other aspect includes the following features. To implement the image processing techniques, the computer system can perform operations including deploying deep learning techniques including deploying a convolutional neural network (CNN) model for pattern recognition and image classification of the digital images captured by the digital imaging device.

An aspect combinable with any other aspect includes the following features. The computer system can receive drilling parameters applied to the wellbore drilling assembly to drill the wellbore. The computer system can apply the received drilling parameters as inputs to the CNN model. The drilling parameters include a rate of penetration, a weight on bit, and wellbore drilling mud flow rate. The computer system can deploy the CNN model, including the received drilling parameters as inputs for the pattern recognition and the image classification of the digital images.

An aspect combinable with any other aspect includes the following features. The computer system can receive drill bit parameters of the drill bit of the wellbore assembly. The drill bit parameters include a number of blades on the drill bit, a type of the drill bit, and a size of the drill bit. The computer system can receive wellbore drilling mud parameters of the wellbore drilling mud. The wellbore drilling mud parameters include mud weight, a mud type including an oil-based what type or a water-based type, and rheological properties of the wellbore drilling mud. The computer system can apply the received drill bit parameters and the received wellbore drilling mud parameters as inputs to the CNN model. The computer system can deploy the CNN model, including the received drill bit parameters and the received wellbore drilling mud parameters as inputs for the pattern recognition and the image classification of the digital images.

An aspect combinable with any other aspect includes the following features. The system includes the shale shaker. The shale shaker includes a mesh on which the solid slurry flows. The mesh includes a wet zone, an intermediate zone and a dry zone. The solid slurry flows past each of the wet zone, the intermediate zone and the dry zone. The non-vibrating member is a horizontal bar attached to the dry zone of the mesh.

An aspect combinable with any other aspect includes the following features. The digital imaging device can capture the images over the period of time while the wellbore drilling assembly is drilling the wellbore. The computer system can receive the images captured by the digital imaging device over the period of time. After classifying each solid object captured in an image received over the period of time as a drill cutting or as a non-drilled solid, the computer system can store the classification of the image with the time instant at which the digital imaging device captured the image. The computer system can determine an existence of a wellbore condition based on classifications of the images captured over the period of time. The computer system can modify a drilling condition operating the wellbore drilling assembly. In response to determining the existence of the wellbore condition.

An aspect combinable with any other aspect includes the following features. The wellbore condition is stuck pipe. The computer system can determine the stuck pipe responsive to identifying an increase in classification of images as non-drilled solids including wellbore cravings. The computer system can modify a wellbore drilling mud flow rate through the wellbore drilling system responsive to determining the stuck pipe.

An aspect combinable with any other aspect includes the following features. The subterranean zone includes a formation through which the wellbore is being drilled by the wellbore drilling assembly. A drill cutting includes a rock separated from the formation. In response to a drill bit of the wellbore drilling assembly contacting the formation while drilling the wellbore. The non-drilled solid is any solid object that is not a drill cutting.

An aspect combinable with any other aspect includes the following features. The non-drilled solids include at least one of cavings, cement, elastomers or fish eyes.

Certain aspects of the subject matter described here can be implemented as a method. One or more processors receive images captured by a digital imaging device mounted to a non-vibrating member of a shale shaker of a wellbore drilling assembly. The shale shaker is positioned at a surface of the Earth adjacent a wellbore and is configured to receive a solid slurry including a mixture of wellbore drilling mud and solid objects found in the wellbore while drilling the wellbore through a subterranean zone. The solid objects include drill cuttings and non-drilled solids. The digital imaging device is oriented to face a portion of the shale shaker that receives the solid slurry. The digital imaging device is configured to capture digital images of the solid objects while the solid slurry is received by the shale shaker. By implementing image processing techniques on the images, the one or more processors classify a first solid object captured in a first image as a drill cutting, and classify a second solid object captured in a second image as a non-drilled solid.

An aspect combinable with any other aspect includes the following features. An image of a solid object includes multiple particles, including particles representing the solid object in a first color and particles representing the remaining portions of the image in a second color different from the first. To implement the image processing techniques, the one or more processors can perform operations including counting a number of particles in the image. The one or more processors identifies the particles representing the solid object. The particles representing the solid object define an ADR representing dimensions of the solid object. The one or more processors determines a long axis of the area and a short axis of the area, the short axis being perpendicular to the long axis. The one or more processors determines the dimensions of the solid object based, in part, on a length of the long axis and a length of the short axis.

An aspect combinable with any other aspect includes the following features. The one or more processors is configured to perform operations including storing dimensions of known drill cuttings and known non-drilled solids. The one or more processors compares the dimensions of the solid object with the store dimensions and identifies the solid object as a drill cutting or a non-drilled solid based on a result of the comparing.

An aspect combinable with any other aspect includes the following features. To implement the image processing techniques, the one or more processors deploys deep learning techniques by deploying a convolutional neural network (CNN) model for pattern recognition and image classification of the digital images captured by the digital imaging device.

An aspect combinable with any other aspect includes the following features. The one or more processors can receive drilling parameters applied to the wellbore drilling assembly to drill the wellbore. The one or more processors can apply the received drilling parameters as inputs to the CNN model. The drilling parameters include a rate of penetration, a weight on bit, and wellbore drilling mud flow rate. The one or more processors can deploy the CNN model, including the received drilling parameters as inputs for the pattern recognition and the image classification of the digital images.

An aspect combinable with any other aspect includes the following features. The one or more processors can receive drill bit parameters of the drill bit of the wellbore assembly. The drill bit parameters include a number of blades on the drill bit, a type of the drill bit, and a size of the drill bit. The one or more processors can receive wellbore drilling mud parameters of the wellbore drilling mud. The wellbore drilling mud parameters include mud weight, a mud type including an oil-based what type or a water-based type, and rheological properties of the wellbore drilling mud. The one or more processors can apply the received drill bit parameters and the received wellbore drilling mud parameters as inputs to the CNN model. The one or more processors can deploy the CNN model, including the received drill bit parameters and the received wellbore drilling mud parameters as inputs for the pattern recognition and the image classification of the digital images.

An aspect combinable with any other aspect includes the following features. The one or more processors can receive the images captured by the digital imaging device over the period of time. After classifying each solid object captured in an image received over the period of time as a drill cutting or as a non-drilled solid, the one or more processors can store the classification of the image with the time instant at which the digital imaging device captured the image. The one or more processors can determine an existence of a wellbore condition based on classifications of the images captured over the period of time. The one or more processors can modify a drilling condition operating the wellbore drilling assembly. In response to determining the existence of the wellbore condition.

Certain aspects of the subject matter described here can be implemented as a computer-readable medium (for example, a non-transitory computer-readable medium) storing instructions executable by one or more processors to perform operations described here.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A and 3B are schematic diagrams of a solid object being analyzed by the solid object monitoring system.

FIGS. 6A and 6B together is a schematic diagram of a regional convolutional neural network (R-CNN) model for solid object monitoring.

Like reference numbers and designations in the various drawings indicate like elements.

DETAILED DESCRIPTION

Wellbore drilling involves breaking rock in a subterranean zone to form and deepen a wellbore and carrying the broken rock (drill cuttings) to the wellbore surface by wellbore mud flowed through the wellbore. The cuttings concentration and classification at the surface provide engineers, geologists and drilling operators with valuable insights about the drilling process including hole cleaning efficiency, characteristics of rock formations that are useful for different applications to optimize drilling performance, and identification of formation changes to reduce non-productive times (NPT) to name a few. This disclosure relates to systems and techniques that can be implemented for automated collection and identification of drill cuttings and non-drilled solids (that is, any solid object carried out of the wellbore by the drilling fluid that is not a drill cutting). As described later, the techniques described implement a digital imaging device along with data analytics models for automatic and real-time characterization of solid objects exiting the wellbore during wellbore drilling (for example, drill cuttings and non-drilled solids) regardless of the sizes or shapes of the objects, or the rate at which the objects flow out of the wellbore with the drilling mud. Implementing the techniques described here negate the need for manual, visual inspection of solid objects to assess and identify potential hazards. Instead, the autonomous monitoring system of solid objects described here can alert the rig crew about possible drilling hazards in real-time. The techniques described here can predict, mitigate or prevent major challenges to wellbore operations, some of which have been described later.

Figure 1:
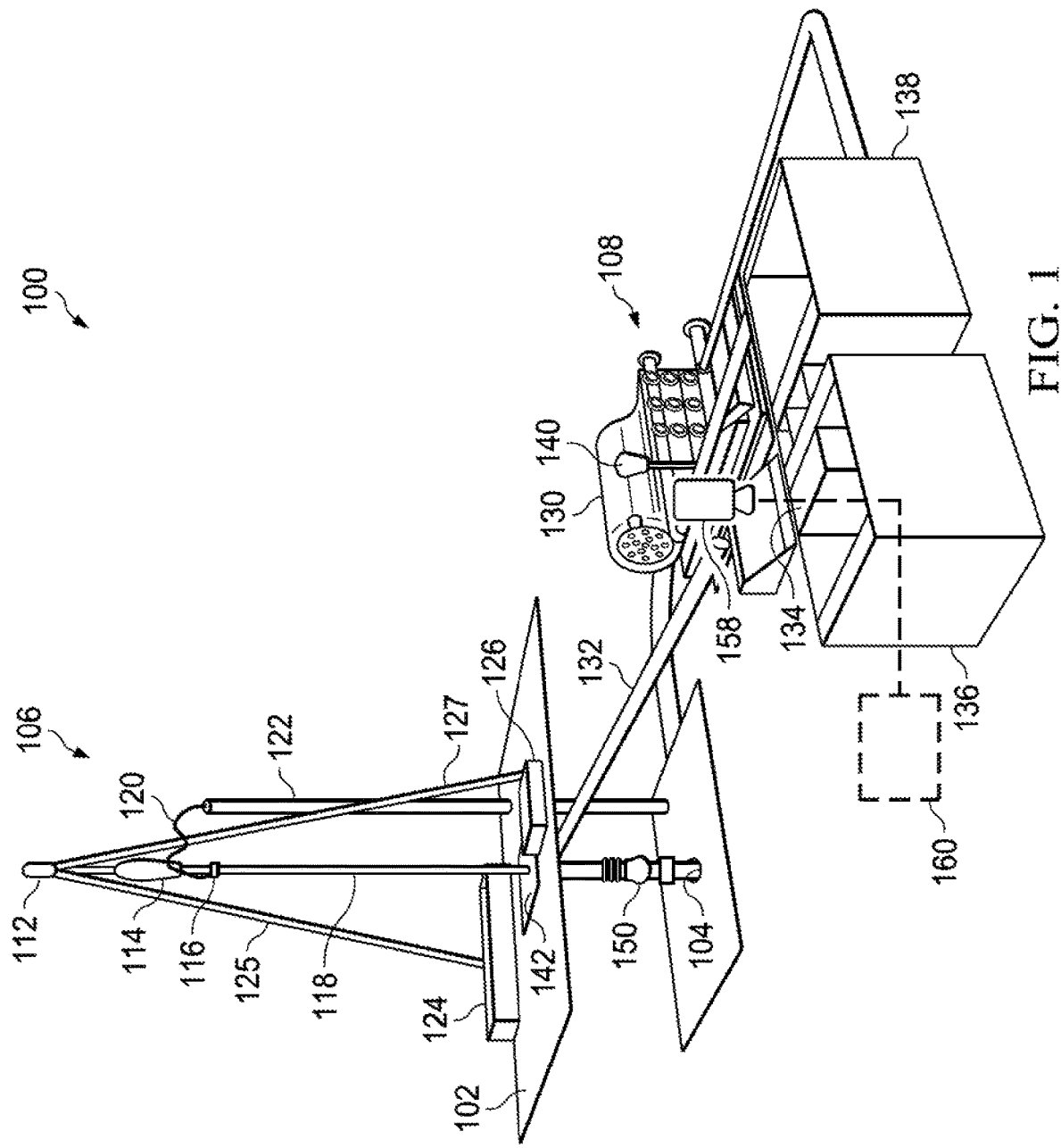
FIG. 1 is a schematic diagram of a wellbore drilling assembly with real-time solid object monitoring.

FIG. 1 is a schematic diagram of a wellbore drilling assembly 100 with real-time solid object monitoring. The wellbore can extend from the surface through the Earth to one or more subterranean zones of interest. The wellbore drilling assembly 100 includes a drill floor 102 positioned above the surface, a wellhead 104, a drill string assembly 106 supported by the rig structure, a fluid circulation system 108 to filter used drilling fluid from the wellbore and provide clean drilling fluid to the drill string assembly 106, and a monitoring system including a digital image capturing device 158 and an onsite computer system 160 (described in more detail later) to monitor in real time solid objects that flow from within the wellbore to the surface, specifically, onto the shale shaker 134. For example, the wellbore drilling assembly 100 of FIG. 1 is shown as a drill rig capable of performing a drilling operation with the wellbore drilling assembly 100 supporting the drill string assembly 106 over a wellbore. The wellhead 104 can be used to support casing or other wellbore components or equipment into the wellbore.

The derrick or mast is a support framework mounted on the drill floor 102 and positioned over the wellbore to support the components of the drill string assembly 106 during drilling operations. A crown block 112 forms a longitudinally-fixed top of the derrick, and connects to a travelling block 114 with a drilling line including a set of wire ropes or cables. The crown block 112 and the travelling block 114 support the drill string assembly 106 via a swivel 116, a kelly 118, or a top drive system (not shown). Longitudinal movement of the travelling block 114 relative to the crown block 112 of the drill string assembly 106 acts to move the drill string assembly 106 longitudinally upward and downward. The swivel 116, connected to and hung by the travelling block 114 and a rotary hook, allows free rotation of the drill string assembly 106 and provides a connection to a kelly hose 120, which is a hose that flows drilling fluid from a drilling fluid supply of the circulation system 108 to the drill string assembly 106. A standpipe 122 mounted on the drill floor 102 guides at least a portion of the kelly hose 120 to a location proximate to the drill string assembly 106. The kelly 118 is a hexagonal device suspended from the swivel 116 and connected to a longitudinal top of the drill string assembly 106, and the kelly 118 turns with the drill string assembly 106 as the rotary table 142 of the drill string assembly turns. The techniques described in this disclosure can be implemented with a top drive system or with the kelly 118.

In the wellbore drilling assembly 100 of FIG. 1, the drill string assembly 106 is made up of drill pipes with a drill bit (not shown) at a longitudinally bottom end of the drill string. The drill pipe can include hollow steel piping, and the drill bit can include cutting tools, such as blades, dics, rollers, cutters, or a combination of these, to cut into the formation and form the wellbore. The drill bit rotates and penetrates through rock formations below the surface under the combined effect of axial load and rotation of the drill string assembly 106. In some implementations, the kelly 118 and swivel 116 can be replaced by a top drive that allows the drill string assembly 106 to spin and drill. The wellhead assembly 104 can also include a drawworks 124 and a deadline anchor 126, where the drawworks 124 includes a winch that acts as a hoisting system to reel the drilling line in and out to raise and lower the drill string assembly 106 by a fast line 125. The deadline anchor 126 fixes the drilling line opposite the drawworks 124 by a deadline 127, and can measure the suspended load (or hook load) on the rotary hook. The weight on bit (WOB) can be measured when the drill bit is at the bottom the wellbore. The wellhead assembly 104 also includes a blowout preventer 150 positioned at the surface 101 of the wellbore and below (but often connected to) the drill floor 102. The blowout preventer 150 acts to prevent wellbore blowouts caused by formation fluid entering the wellbore, displacing drilling fluid, and flowing to the surface at a pressure greater than atmospheric pressure. The blowout preventer 150 can close around (and in some instances, through) the drill string assembly 106 and seal off the space between the drill string and the wellbore wall. The blowout preventer 150 is described in more detail later.

During a drilling operation of the well, the circulation system 108 circulates drilling mud from the wellbore to the drill string assembly 106, filters used drilling mud from the wellbore, and provides clean drilling mud to the drill string assembly 106. The example circulation system 108 includes a fluid pump 130 that fluidly connects to and provides drilling mud to drill string assembly 106 via the kelly hose 120 and the standpipe 122. The circulation system 108 also includes a flow-out line 132, a shale shaker 134, a settling pit 136, and a suction pit 138. In a drilling operation, the circulation system 108 pumps drilling mud from the surface, through the drill string assembly 106, out the drill bit and back up the annulus of the wellbore, where the annulus is the space between the drill pipe and the formation or casing. The hydrostatic pressure from the drilling mud is intended to be greater than the formation pressures to prevent formation fluids from entering the annulus and flowing to the surface and less than the mechanical strength of the formation, as a greater pressure may fracture the formation, thereby creating a path for the drilling muds to go into the formation. Apart from wellbore control, drilling muds can also cool the drill bit and lift rock cuttings from the drilled formation up the annulus and to the surface to be filtered out and treated before it is pumped down the drill string assembly 106 again. The drilling mud returns in the annulus with rock cuttings and flows out to the flow-out line 132, which connects to and provides the fluid to the shale shaker 134. The flow line is an inclined pipe that directs the drilling mud from the annulus to the shale shaker 134. The shale shaker 134 includes a mesh-like surface to separate the coarse rock cuttings from the drilling mud, and finer rock cuttings and drilling mud then go through the settling pit 136 to the suction pit 136. The circulation system 108 includes a mud hopper 140 into which materials (for example, to provide dispersion, rapid hydration, and uniform mixing) can be introduced to the circulation system 108. The fluid pump 130 cycles the drilling mud up the standpipe 122 through the swivel 116 and back into the drill string assembly 106 to go back into the wellbore.

The example wellhead assembly 104 can take a variety of forms and include a number of different components. For example, the wellhead assembly 104 can include additional or different components than the example shown in FIG. 1. Similarly, the circulation system 108 can include additional or different components than the example shown in FIG. 1.

During the drilling operation, solid objects emerge from the wellbore. The solid objects can include drill cuttings, each of which is a rock separated from the formation in response to the drill bit contacting the formation while drilling the wellbore. When drilling open (that is, uncased) wellbores, the drill cuttings can be expected to have a certain geometry that corresponds to the drill bit design. When drilling other downhole elements such as casing windows, plugs or cement shoes in wellbore operations different from wellbore formation, drill cuttings can include cement, elastomers, metals or composites. Solid objects that flow out of the wellbore can also include non-drilled solids, which include any solid object that is not a drill cutting. For example, a rock separated from the formation can be classified as a non-drilled solid if the rock has an unexpected geometry, for example, one that does not correspond to the drill bit design. Certain bit designs produce thin slithery section cuttings as they effectively slice the rock. Other designs offer a crushing action. When rig hydraulic horsepower allows, some formations are drilled using the hydraulic forces or the horsepower (or both) from the bit nozzles in a jetting type action. When the wellbore pressure is lower than the pressure at which formation stability is maintained, collapse of the formation into the well annulus ensues. Such cavings are larger or smaller than drill cuttings, but often have a different geometric shape and dynamic characteristics on the vibrating shaker screen. A caving of a portion of a formation into the wellbore or the wellbore annulus during drilling, for example, because the formation was unexpectedly weakened due to the drilling is another example of a non-drilled solid. Any other foreign objects that have fallen into the wellbore can be a non-drilled solid. In some instances, the presence of unexpected hydrocarbons or gas detectable using appropriate sensors can also be non-drilled solids.

The digital imaging device 158 and the computer system 160 together form a solid object monitoring system that can track each solid object (or liquid) as it emerges from the wellbore and passes through the shale shaker 134. In some implementations, the digital imaging device 158 (for example, a smart camera, an image sensor, vision sensor network or similar digital imaging device) can capture digital images of each solid object. The computer system 160 can receive the images, implement image processing techniques to analyze the received images, and classify each image as either a drill cutting or a non-drilled solid. For example, the computer system 160 can classify a first image as a drill cutting and a second image as a non-drilled solid. In this manner, the computer system 160 can classify images of solid objects received over a period of time. Such classification of solid objects has several applications including, for example, separate identification of cuttings and cavings for stuck pipe prevention, determination of cuttings concentration for effective hole cleaning assessment, identification of foreign objects in the wellbore such as metal shards or swarf associated with component failure, cuttings description for the optimization of drilling parameters and bit wear to determine if the cuttings represent expected characteristics, effectiveness of chemical treatments including hole cleaning sweeps such as pumping high viscosity pills, excessive liquid loading on cuttings potentially caused by incorrect shale shaker operations, and identification of loss of circulation, to name a few.

Implementations are disclosed in the context of the digital imaging device 158 mounted to the shale shaker 134. Alternatively or in addition, the digital imaging device 158 can be mounted on other components of the wellbore drilling assembly, for example, the centrifuge, de-sander, de-silter or other components past which the solid objects flowing out the wellbore pass. In some implementations, the digital imaging device 158 can be mounted elsewhere on the drilling rig site, for example, on a pole installed onto the drilling rig structure or onto or into the ground around the rig structure that effectively hoists the digital imaging device 158 to a birds eye view above the solids control equipment. In any such component, the digital imaging device 158 is mounted to a non-vibrating component that does not vibrate during operation so that the digital imaging device 158 can capture vibration-free images. In some implementations, vibration dampeners can be mounted to a component and the digital imaging device 158 can be mounted to any component whose vibrations have been dampened. In some implementations, the digital imaging device 158 can implement vibration control or shake reduction features to capture vibration- or shake-free images even if mounted on a vibrating structure of a wellbore drilling assembly component. In some implementations, vibration dampeners can be mounted to a component and shake reduction features can be implemented in the digital imaging device 150. In some implementations, image distortions due to vibration or shaking can be removed during image processing.

Figure 2A:
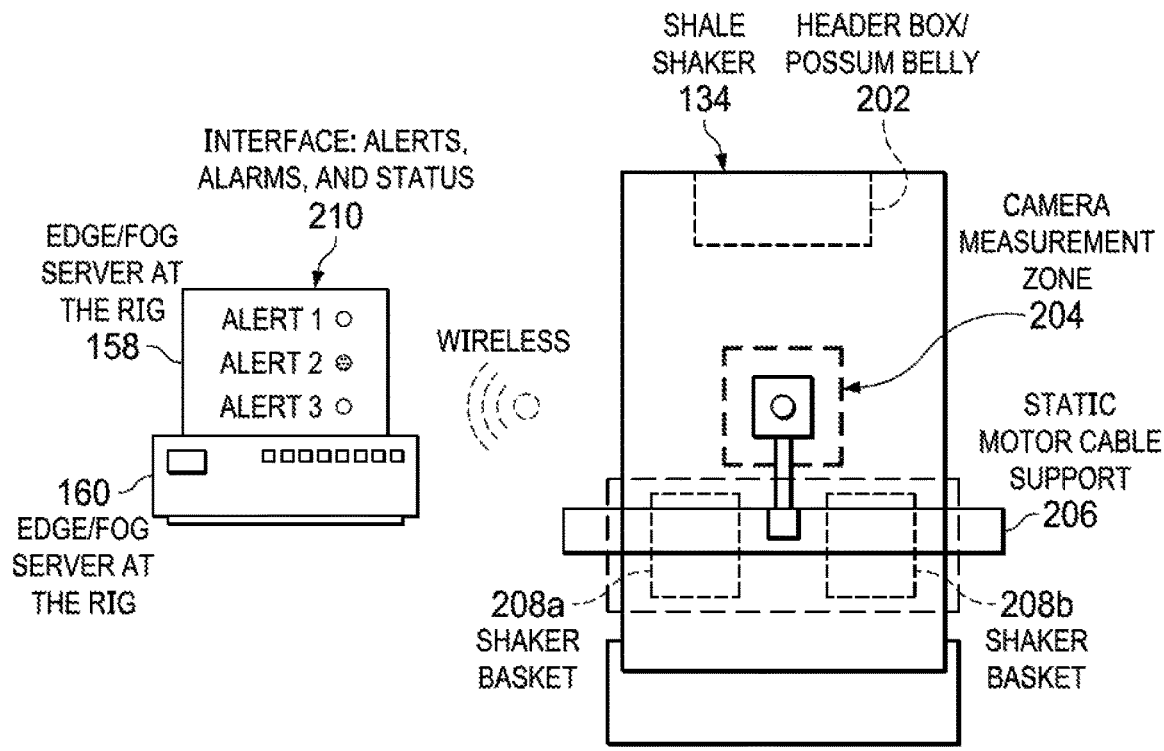
FIGS. 2A and 2B are schematic diagrams of a solid object monitoring system.
Figure 2B:
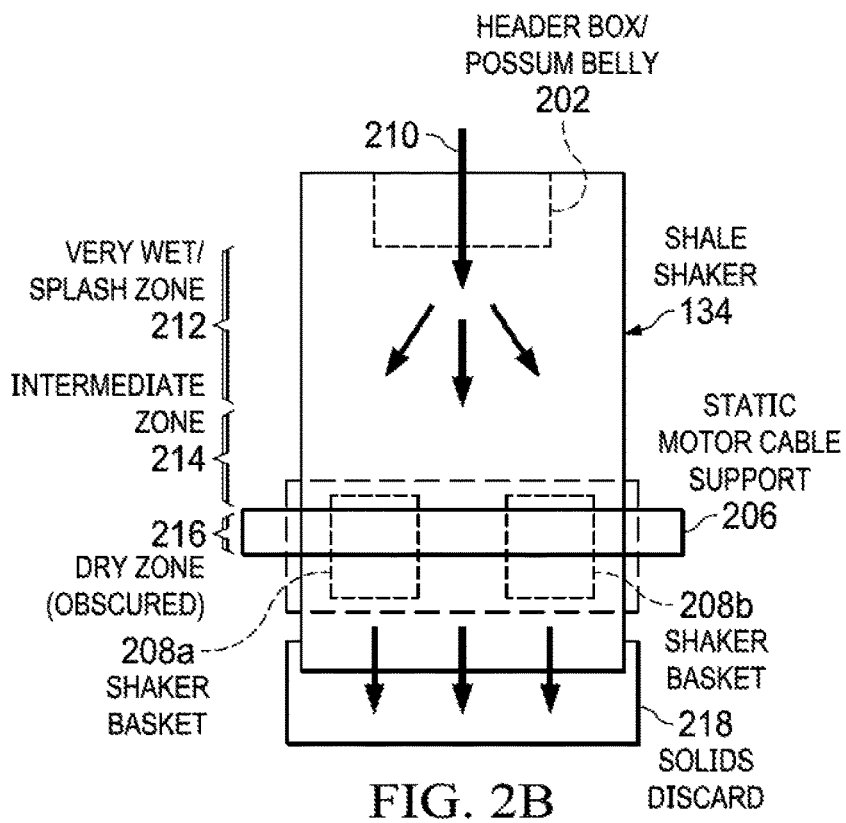

FIGS. 2A and 2B are schematic diagrams of a solid object monitoring system that is attached to the shale shaker 134. FIG. 2A shows that the shale shaker 134 includes a header box/possum belly 202 through which a solid slurry that includes a mixture of the solid objects and the wellbore drilling mud enter the shale shaker 134. Specifically, the solid slurry lands on a shaking screen and is carried downstream of the shale shaker 134 by a vibration of the shaking screen operated by shaker basket motors 208a, 208b. The shale shaker 134 includes a static motor cable support member 206 (for example, a swing arm or other static, non-vibrating member) which spans a width of the shaking screen and that carries cabling or wiring to power the motors 208a, 208b. In some implementations, an image capture zone 204 is defined by the support member 206. The digital imaging device 158 is mounted on and directly attached to the support member 206. The digital imaging device 158 can include a smart, waterproof, high resolution, wireless camera or any other image or vision sensor such as infrared sensor, gamma ray sensor, computerized tomography (CT) scanner, or X-ray sensor, to name a few. The digital imaging device 158 is oriented such that its view finder or screen of the device 158 faces the solid slurry. In particular, the view finder or screen is capable of capturing a plan view of the shaking screen and of the solid objects moved by the shaking screen. The digital imaging device 158 can have a field of view that spans an entire width of the shaking screen so as to image an entirety of the solid slurry carried by the shaking screen. The field of view can also span a length segment of the shaking screen on which multiple solid objects are carried.

FIG. 2B shows different length segments of the moving tray or the mesh or sieve of the shale shaker 134. In particular, the length segment nearest the header box/possum belly 202 can be a very wet or splash zone 212 in which the solid slurry is the most wet, that is, has the largest concentration of drilling mud among all the length segments. The arrow 210 represents a direction of movement of the solid slurry as the shaking screen vibrates. The length segment downstream of the very wet or splash zone 212 is an intermediate zone 214 that is drier compared to the very wet or splash zone 212 because at least some but not all of the drilling mud has been drained from the solid slurry. The length segment downstream of the intermediate zone 214 is the dry zone in which the solid slurry is most dry, that is, has the least concentration of drilling mud among all the length segments. The dry zone 214 can be the length segment that is immediately upstream of the end of the shaking screen. Most, if not all, of the drilling mud liquid has been drained from the slurry leaving only solid objects or mostly solid objects with very little drilling mud in the dry zone 214. The solid objects from which the drilling mud has been separated are discarded in the solids discard zone 218 downstream of the shale shaker screen. The drilling mud (and any fine solids, depending on the mesh size of the shale shaker screen) are gathered into a sump tank for further treatment and recycling for reuse in the wellbore drilling operation.

Returning to FIG. 2A, the digital imaging device 158 is operatively coupled to the computer system 160, for example, by wired or wireless operative coupling techniques. The computer system 160 includes a computer-readable medium (for example, a transitory or a non-transitory computer-readable medium) and one or more processors coupled to the computer-readable medium. The computer-readable medium stores computer instructions executable by the one or more processors to perform operations described in this disclosure. In some implementations, the computer system 160 can implement edge or fog computing hardware and software based on artificial intelligence models including machine learning and deep learning for image or video processing. Together, the digital imaging device 158 and the computer system 160 form an Internet of Things (IoT) platform to be used on a drilling rig and configured to implement a set of artificial intelligence models including machine learning (ML) and deep learning (DL) that serve as the foundation for enabling analysis of new sensors and data streams in real-time to provide advanced solutions for optimization of drilling operations.

In some wellbore drilling assemblies, multiple shale shakers can be implemented. In such instances, a single camera mounted to one of the shale shakers can be used for image capture. The computer system 160 can classify solid objects based on images captured by the single camera and extrapolate or calibrate the classification to the solid objects carried by other shale shakers. In some implementations, a respective camera can be mounted to each shale shaker, and all the shale shakers can transmit captured images to the computer system 160. In such implementations, the computer system 160 can develop a classification of solid objects carried by each individual shale shaker and also develop a drilling assembly-wide classification of solid objects carried by all the shale shakers.

FIGS. 3A and 3B are schematic diagrams of a solid object being analyzed by the solid object monitoring system. In some implementations, the digital imaging device 158 captures static images in a "Snapshot" mode and transmits the captured images to the computer system 160. The computer system 160 can implement a geometric attributes based model to analyze each image. For example, the computer system 160 can define a rectangular boundary 302 around each image received from the digital imaging device 158. Each image can include images of multiple solid objects, specifically, either entire solid objects or partial solid objects, in particular, of solid objects at the edges of the field of view of the digital imaging device 158. As an initial step, the computer system 160 can distinguish solid objects in an image from a background image, for example, the image of the shale shaker screen. To do so, the computer system 160 can store a color of the shale shaker screen and can distinguish a solid object from the shale shaker screen based on a difference between the color of the solid object and the stored color of the shale shaker screen. By repeating this process across an entire area of the image, the computer system 160 can identify different objects.

Subsequently, the computer system 160 can further analyze each portion of the image determined as being an image of a solid object. To do so, the computer system 160 can count the number of particles in a window surrounding the image of the solid object. The computer system 160 can compare the number of particles with a threshold particle count, which is representative of a threshold dimension. That is, because dimensions of a drill cutting are expected to fall within a certain range, the computer system 160 can determine a threshold particle count for an image of a drill cutting and store the threshold particle count. The threshold particle count can include an upper limit and a lower limit. Upon analyzing an image of a solid object received from the digital imaging device 158, the computer system 160 can determine the particle count. If the particle count falls within the upper limit and the lower limit of the threshold particle count, the computer system 160 can associate an increased likelihood that the solid object in the image is a drill cutting. In contrast, if the particle count falls outside the upper limit or the lower limit, then the computer system 160 can associate a decreased likelihood that the solid object is a non-drilled solid. The computer system 160 can similarly store threshold particle counts with corresponding upper and lower limits for other non-drilled solids. Upon determining that an object is a non-drilled solid, the computer system 160 can determine a likelihood that the non-drilled solid is of a particular type, for example, a rock having a geometry that does not correspond to a particular wellbore drilling condition, a caving, metal, composite or other non-drilled solid.

Next, the computer system 160 can determine a long axis 308 (FIG. 3B) and a short axis 310 (FIG. 3B) for each solid object from the image of the solid object. Determining the long axis and the short axis for each of multiple images of solid objects enables the computer system to determine a size distribution curve and volume estimations for all the solid objects carried past the digital imaging device 158. The computer system 160 can determine the size distribution and volume estimations additionally based on the likelihoods described earlier. As described later, the computer system 160 can use the output of implementing the geometric attributes model to evaluate wellbore drilling parameters or performance by evaluating questions such as whether the shale shaker screen is broken or the shale shaker motors are malfunctioning. The shaker motors malfunctioning is characterized by the analysis of the motion characteristics of the solids. As the solids vibrate, the G-force or acceleration being applied to the screen by the shaker is high. The operational trade-off is high G-force from shakers (best recycled) versus having to replace broken shaker screens (expensive).

In some implementations, the computer system 160 can implement an artificial intelligence based model to analyze each image. In one example, the computer system 160 can implement a supervised learning model. For each type of drill bit (for example, a PDC, a roller cone or fixed cutter) and the associated drilled formation, the computer system 160 can use a set of images at the shale shaker containing cuttings to train a ML or DL model. The ML or DL model is derived by using the set of photos from the expected cutting conditions to identify drill cuttings for a given drilling operation based, in part, on drilling parameters, drill bit type and specifications, formation being drilled, drilling mud being used (that is, oil-based or water-based), among others. For example, the computer system 160 can use regional convolutional neural networks (R-CNN) or other variations (for example, CNNs, faster R-CNNs) to automatically identify features describing the solid objects captured in the images. The computer system 160 can train the models to discriminate drill cuttings having expected cutting shapes and concentration from non-drilled solids. Additionally, the ML or DL models can be trained to classify (categorical or numerical) hole cleaning performance, cuttings concentration, among others.

Figure 4:
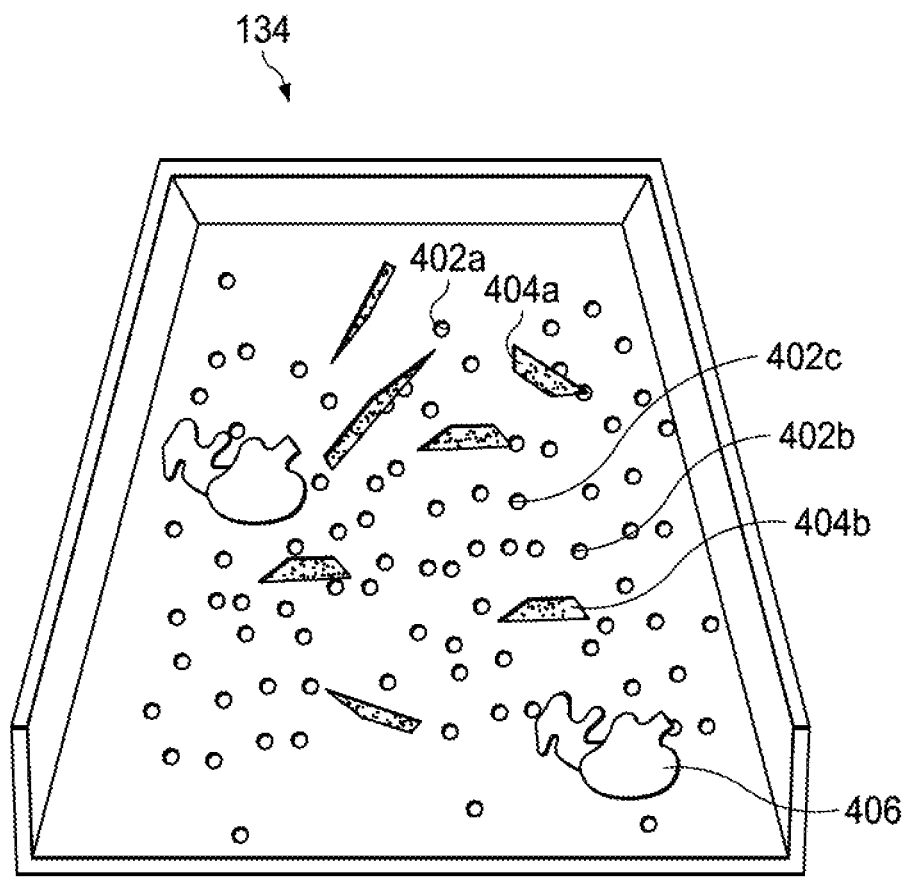
FIG. 4 is a schematic diagram of a shale shaker carrying different types of objects.
Figure 5A:
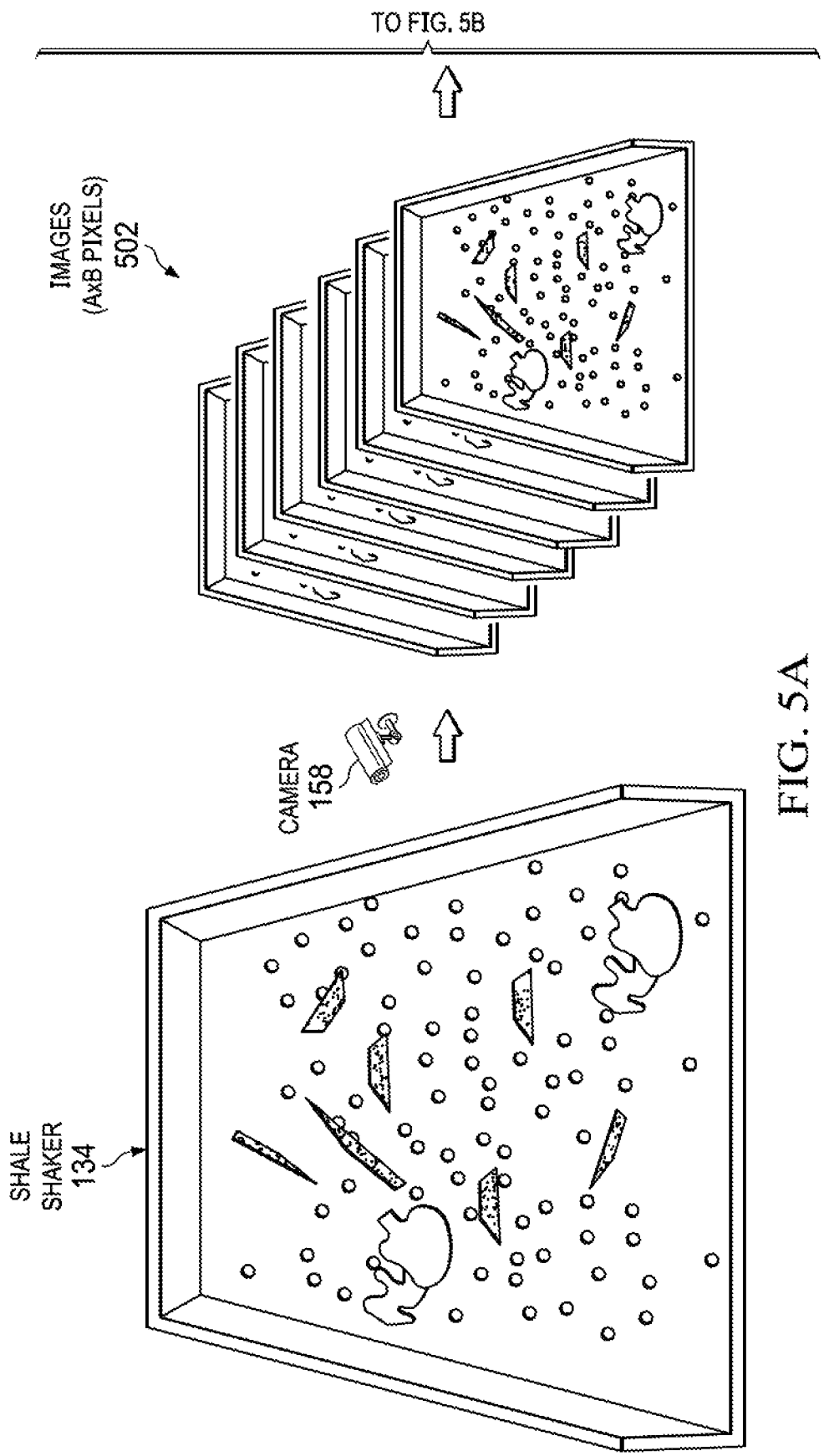
FIGS. 5A and 5B together is a schematic diagram of a convolutional neural network (CNN) model for solid object monitoring.
Figure 5B:
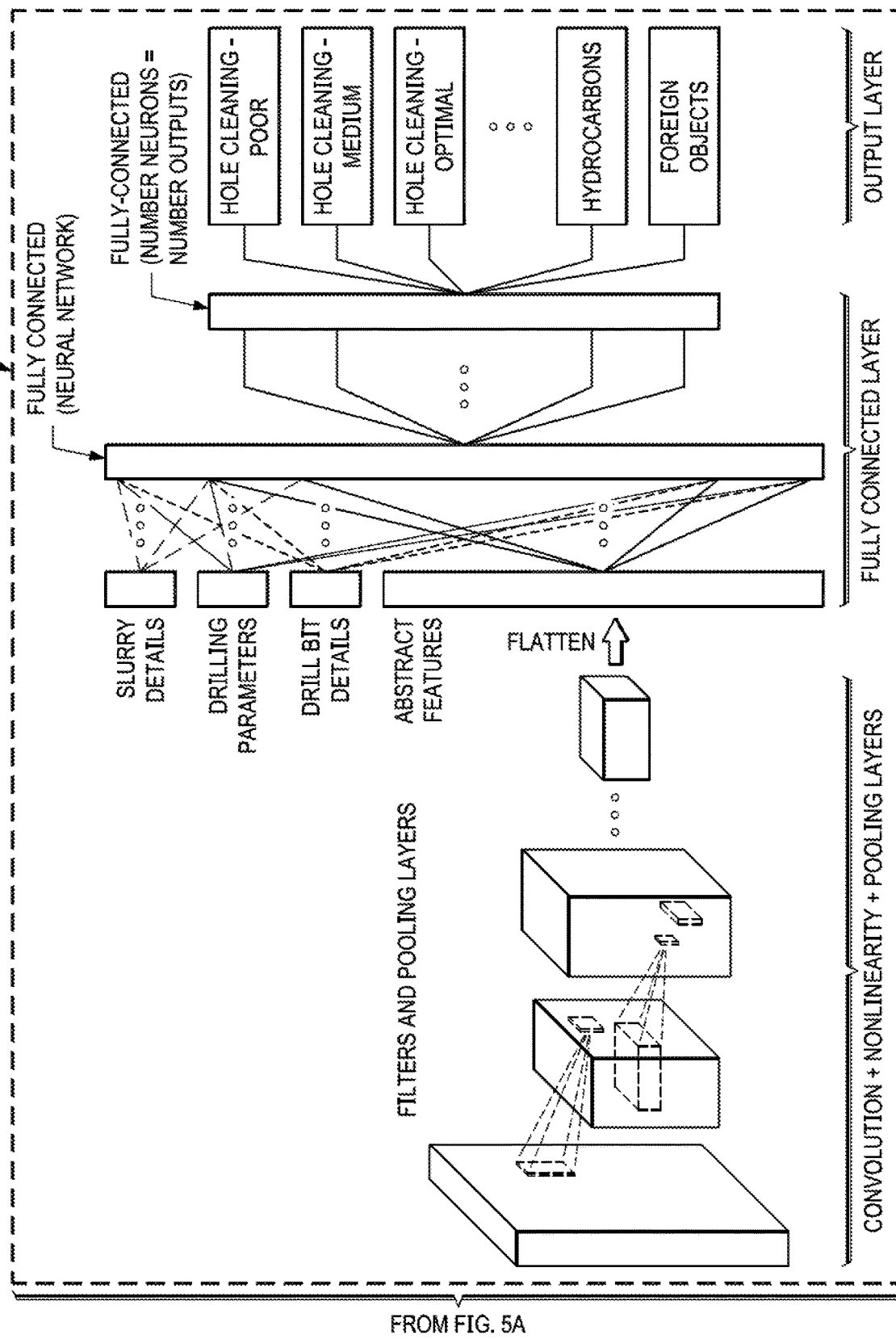

Examples of a CNN model and a R-CNN model are described with reference to FIGS. 4, 5 and 6. FIG. 4 is a schematic diagram of a shale shaker 134 carrying different types of objects. In the schematic diagram, the shale shaker 134 is carrying objects of different types including drill cuttings (402a, 402b, 402c), non-drilled solids (404a, 404b) and non-solid objects (406), for example, liquid hydrocarbon from the wellbore. As described earlier, the digital imaging device 158 captures multiple images of the shale shaker 134 carrying these objects over a period of time, and transmits the images to the computer system 160. FIGS. 5A and 5B together is a schematic diagram of a CNN model implemented by the computer system 160. A CNN is a suitable DL model for pattern recognition and image classification as it exploits spatial correlation/dependencies in the data. FIGS. 5A and 5B together shows the structure of a generic CNN implemented by the computer system 160. The CNN has varying size and number of filter and pooling layers to automatically extract features from the images obtained at the shale shaker 134. The computer system 160 flattens the features extracted from the images as a vector that is then input to a fully connected layer with a varying number of neurons that functions as a traditional neural network. The computer system 160 can receive drill bit details (for example, number of blades, type of bit, size, other drill bit details), drilling parameters (for example, rate of penetration, weight on bit, slurry flow-in/out, stand pipe pressure, other drilling parameters) and drilling mud details (for example, weight, oil-based or water-based, rheological properties, other drilling mud details) as inputs to the fully connected layer. The computer system 160 can execute the CNN model using the received inputs to classify the solid objects into drill cuttings or non-drilled solids and to identify drill cuttings concentration, and use the classification and identification to determine conditions such as a need for hole cleaning, circulation losses or other wellbore conditions. The computer system 160 can use the second fully connected layer with n number of neurons as a multi-class predictor used to determine the different conditions, for example, hole cleaning (poor, medium, optimal or other), presence of hydrocarbons, cavings or foreign objects, cuttings concentration (percentage), among others.

Figure 6A:
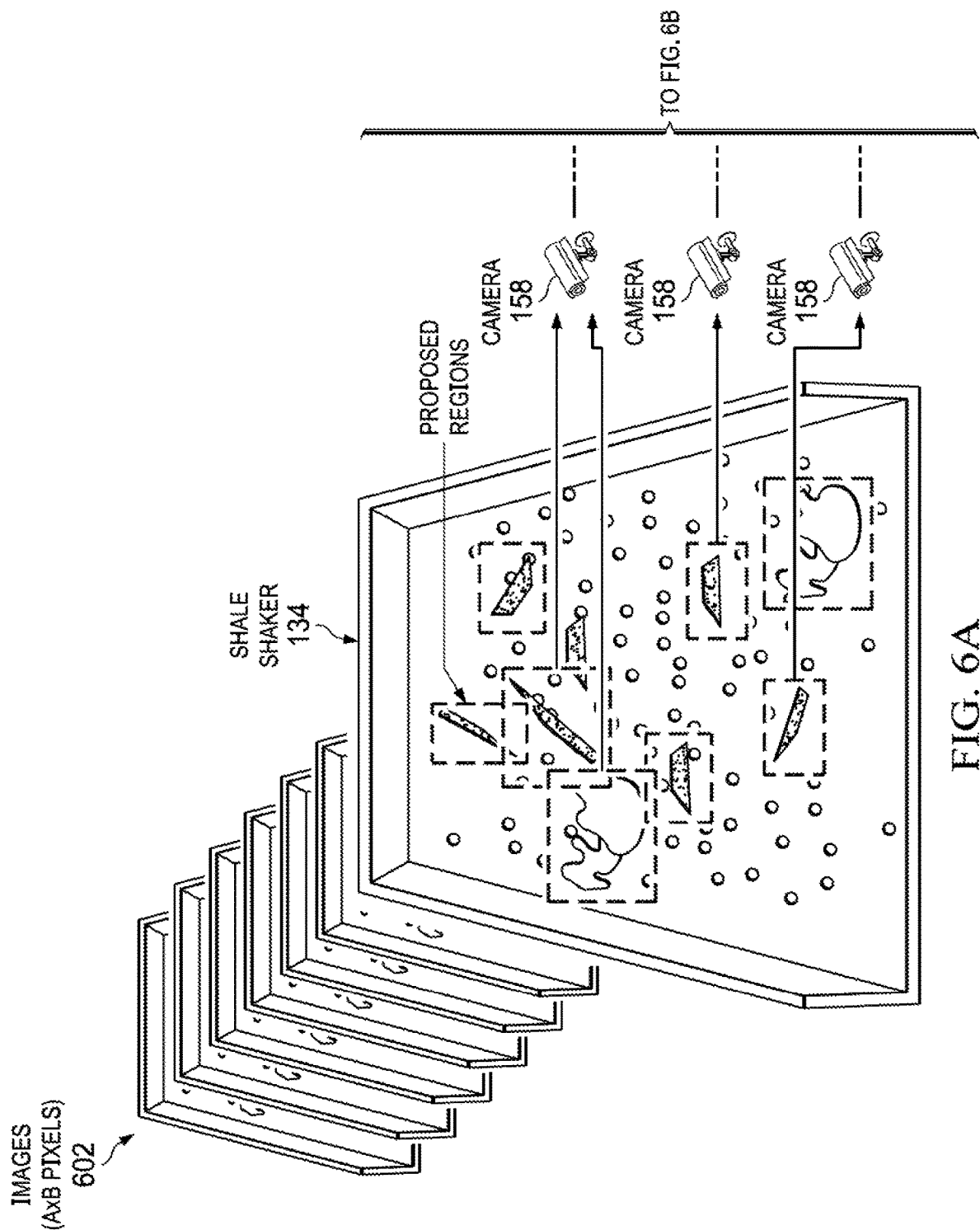

In some applications, the computer system 160 can be configured to identify the occurrence of objects to assess the severity of conditions, for example, a number of cavings at a given time. In such applications, a regional-CNN (R-CNN), fast R-CNN, faster R-CNN, You Only Look Once (YOLO) or other variations can be used to identify the regions of interest, highlight and count the identified objects. Such models can also function as a multi-class predictor. FIGS. 6A and 6B together is a schematic diagram of a R-CNN model. To implement the R-CNN, the computer system 160 extracts 2,000 regions from each image (referred as proposed regions) using a selective search algorithm. The computer system 160 feeds the proposed regions of interest into a traditional CNN that produces a 4,096 dimensional feature vector as output. As such, the CNN acts as a feature extractor for each proposed region. To account for the drill bit details, drilling parameters and slurry details, as described earlier, the computer system 160 concatenates such attributes to the feature vector for each proposed region. By doing so, the computer system 160 defines a region by 4,096 dimensional features from the CNN plus the added parameters. The computer system feeds the total set of features for each proposed region into a traditional support vector machine (SVM) model and executes the model to classify the presence of the object within the proposed regions. In this manner, the computer system 160 can determine the presence or absence of drill cuttings, the presence or absence of non-drilled solids, for example, cavings, foreign objects, the presence or absence of hydrocarbons, the quality of hole cleaning conditions (poor or medium or efficient), the presence or absence of medium hole cleaning, and a level of bit wear (optimal or poor), to name a few. In such implementations, the computer system 160 includes a visualization and processing module 604 that displays the images and the bounding boxed for the identified objects to a user, for example, a rig operator. The module 604 can be a collection of software, firmware or any combination of them embodied as computer instructions executable by the one or more processors included in the computer system 160. The module 604 can perform other statistics to compute drill cutting concentrations, amount of cavings or other, more sophisticated calculations. Other variations of CNNs capable of processing more than 2,000 proposed regions can be used as well.

In some implementations, the computer system 160 can implement unsupervised learning models. For example, the computer system 160 can receive as input, a set of different features describing the cuttings' geometric shape and concentration for unsupervised learning, such as, clustering or principal component analysis. The computer system 160 can detect anomalies or outlier conditions as an output of the unsupervised learning. The features describing the drill cuttings in the image can include all or a subset of the geometric attributes (described earlier) along with a set of abstract features identified by any DL model (for example, CNN or auto encoders, to name a few).

In the implementations described earlier, example operations of the computer system 160 were described with static images as inputs. In some implementations, the computer system 160 can operate using video (recorded or live) as inputs. For example, the computer system 160 can implement a geometric and physical attributes model that uses speed of solid objects movement and total number of objects together with vibration amplitude and speed of movement correlated to determine object mass and volume. In such implementations, the computer system 160 can correlate speed and vibration analysis to shaker performance.

Alternatively, the computer system 160 can implement artificial intelligence based models with video (recorded or live) as inputs. For example, for each type of drilling bit (PDC, roller cone or fixed cutter) and the associated drilled formation, the computer system 160 can use a ML/DL model with memory to identify the evolution of events with respect of time. The ML/DL models for video processing do not consider the images as individual photos. Instead, the ML/DL with memory considers the photos as a video by looking at the images in a sequence. These sequences of photos may be used to more accurately identify the cuttings concentrations, anomalies or other features for enabling different applications. DL models with memory (for example, recurrent neural networks, long/short term memory network, similar models) allow to understand the context of a video frame relative to the frames that came before it. This is done by passing the output of one training step to the input of the next training step along with new frames.

Table 1 lists expected cutting sizes for a particular rock formation that can be used as a reference and input for the models executed by the computer system 160.

TABLE 1

| Rock | Grain size | Description |
| --- | --- | --- |
| Claystone and shale | Less than 4 microns | Rocks formed from an accumulation of clay minerals and silt size particles |
| Marl | Less than 4 microns | Rocks formed from an accumulation of clay minerals and calcite (calcium carbonate) |
| Siltstone | 4 to 60 microns | Rocks formed from an accumulation of mineral grains (quartz). |
| Sandstone | 60 microns to 2 mm | Sandstone compressive strength, +/−9000 psi |
| Conglomerate | Greater than 2 mm | Rocks formed from an accumulation of primarily granule, pebble and boulder size particles |
| Limestone Dolomite & chalk Chert | Chemical rocks | Rocks formed from large deposits of primarily calcite (calcium carbonate) and dolomite (calcium magnesium) Compressive strengths: Limestone, +/−20,000 psi; Dolomite, +/−24,000 psi; Chert, +/−83,000 psi; Chalk, +/−6000 psi; |
| Gypsum & anhydrite Salt | Evaporates | Rocks composed of minerals that precipitated from solution during the evaporation of water Compressive strength: Anhydrite +/−6000 psi |
| Basement Volcanics | Igneous rock | Rock formed from the cooling of molten magma |
| Fault | A geologic feature | A fracture in the rock caused by natural forces resulting in failure and displacement of the formation along the fault plane |
| Oil | | Liquid hydrocarbon (5.0 to 7.1 ppg) |
| Gas | Native formation fluids | Gaseous hydrocarbon (2.3 ppg average) |
| Water | | Water (8.3 to 11.7 ppg) |

The solid objects classification output by the computer system 160 can be synchronized with other sensors at the rig, such as, drilling surface parameters (for example, weight on bit, torque, stand pipe pressure, slurry flow, revolution per minute), downhole data (for example, logging while drilling data, measurement while drilling data) and any other sensor to enable applications described later.

Example Applications

Cuttings and Cavings Identification for Stuck Pipe Prevention

Cuttings refer to the solid rock generated by the drill bit. Cavings represent the rock broken into large or small pieces from a rock formations in the open hole. Cavings can fall into the wellbore and jam the drill string in the hole, leading to a packed-off or stuck drill string. Cavings may be produced from 1) fractured and faulted formations, 2) induced over-pressured shale collapse, 3) natural over-pressure shale collapse, 4) reactive formations, 5) tectonically stressed formations, and 6) unconsolidated formations. The issues in these types of formations may occur during different drilling operations and show different indications. The presence of cavings at the shale shaker is common but may differ in size, color, shape, stickiness, etc. By comparing planned solid volumes, calculated by [hole size (m$^2$)×rate of penetration (m/hr)=expected volume (m$^3$/hr)] with measured solids volume output by the computer system 160, a trend can identify if ineffective hole cleaning or solids removal is occurring, leaving increasing volumes of solids in the well. If the wellbore is unstable and therefore collapsing, thereby creating cavings in addition to drill cuttings, the cavings often present with different geometry and characteristics identifiable by the multi-axis measurements described earlier. In addition to analyzing the geometry of the cavings, the computer system 160 can implement ML models to automatically identify the presence of cavings at the shale shaker or other anomalies in the drill cuttings. In the case of detected cavings or larger than anticipated cuttings at the shale shakers, the computer system 160 can transmit a cavings warning through an interface module that can be presented as a visual warning or audible warning.

Cuttings Concentration for Effective Hole Cleaning Assessment

Proper hole cleaning consists in the removal of sufficient cuttings from the wellbore to allow the reasonably unhindered passage of the drill string and the casing. Good hole cleaning not only reduces the chances of stuck pipe incidents but also enables achieving an optimal rate of penetration. To avoid the settlement or avalanche of cuttings in deviated wells, the operations consider the drilling fluid properties and adequate flow rates while maintaining mechanical movements of the pipe, circulating for enough time (several bottom-ups) and monitoring the trends and concentration of cuttings at the shale shakers. The techniques described in this disclosure enables the autonomous cuttings analysis to enforce proper hole cleaning by comparing planned solids volume with expected volume (m$^3$/hr) as described earlier. The techniques described here can also be implemented to calculate lag time, which is time for the solids slurry from the bottom of the well to exit at the shale shaker. Accurate lag time facilitates the positioning of solids recovered at the surface with a downhole depth in the wellbore.

Identification of Foreign Objects

Foreign objects include objects such as metal shards or swarf, cement, elastomer elements associated with component failure or unexpected drilling items. The foreign objects or other debris may fall into the wellbore from the surface or from downhole equipment and potentially jam the drill string in the wellbore. The techniques described in this disclosure develop an expected profile of solid object characteristics associated with a specific bit type, formation, activity or depth of drilling. Metal or rubber debris at the shale shaker is an indication of foreign objects in the well. When the properties of solid objects detected by the computer system 160 deviates from properties of expected solid objects, the computer system 160 can transmit a foreign objects warning through an interface module that can be presented as a visual warning or audible warning. Responsive intervention can prevent costly NPT associated with resulting equipment failure should unplanned solids migrate to solids control systems, pumping systems or downhole tools. Moreover, the ML/DL models described here can automatically identify foreign objects by detecting unexpected solid objects.

Cuttings Description for the Optimization of Drilling Parameters and Bit Wear

The techniques described here can be implemented to confirm that the solid objects imaged at the shale shaker represent the expected characteristics. During the pre-planning phase of a new well, rock formation and depths are approximated by considering the offset drilled wells. However, planned formation tops may differ from the actual formation depths. Considering that drilling parameters (for example, rate of penetration, weight on bit, slurry flow) and type of bit are dependent on the rock formation to be drilled, using the wrong setup and parameters may increase the bit wear while reducing the overall drilling performance. By implementing the techniques described here, the computer system 160 will develop an expected profile of solid objects characteristics associated with a specific bit type, formation, activity or depth of drilling. For planned formations, the computer system 160 can classify drilled solids measurements with an optimized drilling configuration, such as bit type and expected condition. Poor bit performance (however caused) manifesting in irregular shaped solids can trigger an alarm, prompting user investigation. Moreover, different ML/DL models may be trained to identify the rock cuttings patterns (size, shape, concentration) for each rock formation type. For example, the output of executing an ML/DL model when drilling through limestone is expected to be fine grained cuttings. Otherwise, the computer system 160 can automatically raise an alarm.

Effectiveness of Chemical Treatments

Implementing the techniques described here can improve effectiveness of chemical treatments including hole cleaning sweeps such as pumping high viscosity pills. When returning to surface, hole cleaning pills are intended to transport a significant additional volume of cuttings back to surface, effectively sweeping the well clear of potentially hazardous build ups. Correlating expected solids with measured values provides a sweep effectiveness ratio, which can be used to determine pill effectiveness. Moreover, a ML/DL model can learn the effects of the viscosity pills visible at the shale shakers. These models are able to extract abstract features from the photos or videos in order to identify the rock cuttings patterns and concentration at the shale shakers for an efficient high viscosity pill.

Effective Liquid Loading on Cuttings

Implementing the techniques described here can monitor for excessive loading on cuttings potentially caused by incorrect solids control operations, for example, faulty shaker operations. In some implementations, data can be interpreted to provide an effective dryness range for solids being removed from the solids control equipment being monitored. Excessive liquid loading can trigger an alarm. An example cause may be the shale shaker motor or motors malfunctioning. Or, the shale shaker screens may be incorrectly chosen for optimal solids drying. Alternatively or in addition, the shale shaker may be overloaded by slurry volume and additional units (capacity) are needed to compensate. The computer system 160 can be trained to automatically detect excessive liquid loading.

Incorrect or Sub-Optimal Solids Control Equipment Operations

Solids control equipment include shakers, centrifuges, hydrocyclones, de-sanders and de-silters, to name a few. In some implementations, the computer system 160 can interpret data determined by analyzing the images of the solid objects received from a solids control equipment to provide an effective dryness range for solids being removed from other solids control equipment being monitored. Sudden, unplanned change in properties, such as, lack of solids discharge, excessively wet solids or other visual indications of sub-optimal performance in either the solids or liquids discharge can trigger review of and change in the equipment control or operation including switching the equipment off, and can also trigger an alarm.

Slurry Monitoring for Early Detection of Kicks/Blowouts and Circulation Losses

Implementing the techniques described here can enable early detection of kicks, blowbacks and circulation losses by monitoring the solids slurry received at the shale shaker. Formations are usually under high pressure due to the massive weight of the formations above and high temperatures of the earth layers. If this pressure is not contained while drilling, the pressure escapes the formation to the surface through the wellbore. This increase in pressure may be the result from the influx of water, oil, or gas in the borehole and is known as a kick. Manual kick detection involves observing an increase in the level of the mud or solids slurry pits. The techniques described here can link surface drilling parameters (for example, slurry flow into the wellbore in gallons per minute) and the information captured by the digital imaging device at the shale shakers to detect abnormal increase of fluid at the shale shakers. As such, if a constant flow in (gallons per minute) is being used but there is an increase of fluid or anomalous behavior at the shale shakers, the computer system 160 can trigger an alarm indicating an imminent kick. Additionally, the ML/DL models may be trained to automatically detect any presence of hydrocarbons or gases at the shale shakers due to an influx.

Wellbore Trajectory and Geometry Verification

After every cementing job, a cement plug remains in the casing and open hole section. After the cement hardens, a cleanout assembly is used to drill the cement plug and the rat hole (few feet into the new formation). During the cleanout operation, it is possible to approximate the amount of cement in the plug that that is expected at the shale shakers. If the computer system 160 observes a different amount of cement compared to an expected amount, that indicates a possible deviation in the wellbore trajectory, which is critical for reaching the target depth in deviated wells. By comparing planned solids volume with expected volume and measured solids volume, the computer system 160 can identify a trend if the wellbore trajectory is correct by drilling through the cement plug.

Figure 7:
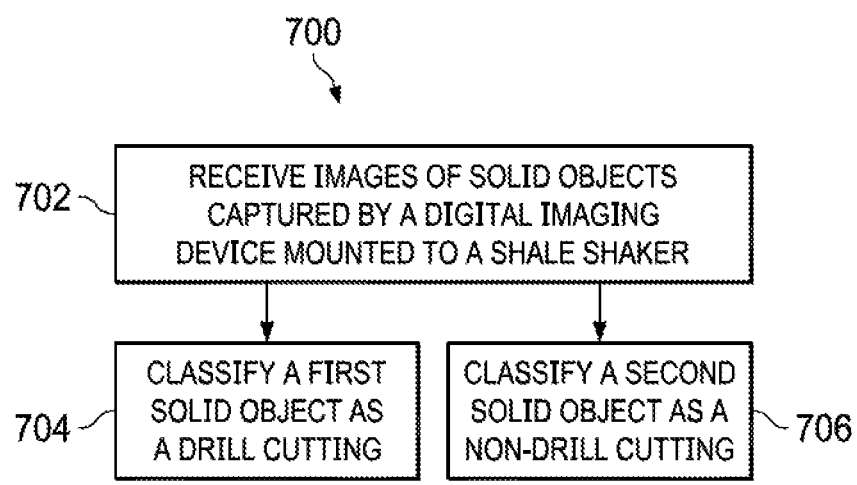
FIG. 7 is a flowchart of an example of a process for solid object monitoring.

FIG. 7 is a flowchart of an example of a process 700 for solid object monitoring. At 702, one or more processors (for example, the processors of the computer system 160) receive images captured by a digital imaging device mounted to a non-vibrating member of a shale shaker of a wellbore drilling assembly. The shale shaker is positioned at a surface of the Earth adjacent a wellbore and configured to receive a solid slurry including a mixture of wellbore drilling mud and solid objects found in the wellbore while drilling the wellbore through a subterranean zone. The solid objects include drill cuttings and non-drilled solids. The digital imaging device is oriented to face a portion of the shale shaker that receives the solid slurry. The digital imaging device is configured to capture digital images of the solid objects while the solid slurry is received by the shale shaker.

At 704, using image processing techniques, the one or more processors classify a first solid object captured in a first image as a drill cutting. At 706, using image processing techniques, the one or more processors classify a second solid object captured in a second image as a non-drilled solid. An image of a solid object includes multiple particles (for example, pixels) including particles representing the solid object in a first color and particles representing remaining portions of the image (for example, other objects, shale shaker background) in a second color different from the first. To implement the image processing techniques, the one or more processors count a number of particles in the image. The one or more processors identify the particles representing the solid objects. Such particles define an area representing dimensions of the object. The one or more processors determine a long axis and a short axis of the area, the two axes being perpendicular to each other. The one or more processors determine the dimensions of the solid object based, in part, on a length of the long axis and a length of the short axis.

The one or more processors store dimensions of known drill cuttings and known non-drilled solids. The one or more processors compare the dimensions of the solid object with the stored dimensions. The one or more processors identify the solid object as a drill cutting or a non-drilled solid based on a result of the comparing. To implement the image processing techniques, the one or more processors deploy deep learning techniques that includes deploying a CNN model for pattern recognition and image classification of the digital images captured by the digital imaging device. The one or more processors receive drilling parameters applied to the wellbore drilling assembly to drill the wellbore. The one or more processors apply the received drilling parameters as inputs to the CNN model. The drilling parameters include a rate of penetration, a weight on bit and wellbore drilling mud flow rate, to name a few. The one or more processors deploy the CNN model including the received drilling parameters as inputs for the pattern recognition and image classification of the digital images.

The one or more processors receive drill bit parameters of the drill bit of the wellbore drilling assembly. The drill bit parameters include a number of blades on the drill bit, a type of the drill bit and a size of the drill bit. The one or more processors receive wellbore drilling mud parameters of the wellbore drilling mud. The wellbore drilling mud parameters include mud weight, a mud type including an oil-based mud type or a water-based mud type and rheological properties of the wellbore drilling mud. The one or more processors apply the received drill bit parameters and the received wellbore drilling mud parameters as inputs to the CNN model. The one or more processors deploy the CNN Model including the received drill bit parameters and the received wellbore drilling mud parameters as inputs for the pattern recognition and the image classification of the digital images.

The digital imaging device is configured to capture the images over a period of time while the wellbore drilling assembly is drilling the wellbore. The one or more processors receive the images captured by the digital imaging device over the period of time. After classifying each solid object captured in an image received over the period of time as a drill cutting or as a non-drilled solid, the one or more processors store the classification of the image with a time instant at which the digital imaging device captured the image. The one or more processors determine an existence of a wellbore condition based on the classification of the images captured over the period of time. The one or more processors modify a drilling condition operating the wellbore drilling assembly in response to determining the existence of the wellbore condition. Such modification can be triggered by outputting an alarm which alerts the operating crew of the need to modify the wellbore condition.

Implementations of the subject matter have been described in the context of wellbore drilling when forming a wellbore. The techniques described here are also applicable in other drilling applications, for example, drilling through plugs or other seals in the wellbore that use fluids to flow the resulting solid objects out of the wellbore onto shale shakers or other solids control equipment.

For the purposes of this disclosure, the terms "real-time," "real time," "realtime," "real (fast) time (RFT)," "near(ly) real-time (NRT)," "quasi real-time," or similar terms (as understood by one of ordinary skill in the art) mean that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit (or a combination of these or other functions) the data.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system comprising:
a digital imaging device mounted to a non-vibrating member of a shale shaker of a wellbore drilling assembly, the shale shaker positioned at a surface of the Earth adjacent a wellbore and configured to receive a solid slurry comprising a mixture of wellbore drilling mud and solid objects found in the wellbore while drilling the wellbore through a subterranean zone, the solid objects comprising drill cuttings and non-drilled solids, the digital imaging device oriented to face a portion of the shale shaker that receives the solid slurry, the digital imaging device configured to capture digital images of the solid objects while the solid slurry is received by the shale shaker; and
a computer system operatively coupled to the digital imaging device, the computer system comprising:
one or more processors; and
a computer-readable medium storing instructions executable by the one or more processors to perform operations comprising:
receiving the images captured by the digital imaging device; and
by implementing image processing techniques on the images, classifying a first solid object captured in a first image as a drill cutting and a second solid object captured in a second image as a non-drilled solid, wherein, to implement the image processing techniques, the computer system is configured to perform operations comprising deploying deep learning techniques comprising deploying a convolutional neural network (CNN) model for pattern recognition and image classification of the digital images captured by the digital imaging device,
wherein the operations further comprise:
receiving drilling parameters applied to the wellbore drilling assembly to drill the wellbore;
applying the received drilling parameters as inputs to the CNN model, wherein the drilling parameters comprise a rate of penetration, a weight on bit, and wellbore drilling mud flow rate; and
deploying the CNN model including the received drilling parameters as inputs for the pattern recognition and the image classification of the digital images.

2. The system of claim 1, wherein an image of a solid object comprises a plurality of particles including particles representing the solid object in a first color and particles representing remaining portions of the image in a second color different from the first, wherein, to implement the image processing techniques, the computer system is configured to perform operations comprising:
counting a number of particles in the image;
identifying the particles representing the solid object, wherein the particles representing the solid object define an area representing dimensions of the solid object;
determining a long axis of the area;
determining a short axis of the area, the short axis being perpendicular to the long axis; and
determining the dimensions of the solid object based, in part, on a length of the long axis and a length of the short axis.

3. The system of claim 2, wherein the computer system is configured to perform operations comprising:
   storing dimensions of known drill cuttings and known non-drilled solids;
   comparing the dimensions of the solid object with the stored dimensions; and
   identifying the solid object as a drill cutting or a non-drilled solid based on a result of the comparing.

4. The system of claim 1, wherein the computer system is configured to perform operations comprising:
   receiving drill bit parameters of the drill bit of the wellbore drilling assembly, the drill bit parameters comprising a number of blades on the drill bit, a type of the drill bit and a size of the drill bit;
   receiving wellbore drilling mud parameters of the wellbore drilling mud, the wellbore drilling mud parameters comprising mud weight, a mud type comprising an oil-based mud type or a water-based mud type, and rheological properties of the wellbore drilling mud;
   applying the received drill bit parameters and the received wellbore drilling mud parameters as inputs to the CNN model; and
   deploying the CNN model including the received drill bit parameters and the received wellbore drilling mud parameters as inputs for the pattern recognition and the image classification of the digital images.

5. The system of claim 1, further comprising the shale shaker, wherein the shale shaker comprises a mesh on which the solid slurry flows, wherein the mesh comprises a wet zone, an intermediate zone and a dry zone, wherein the solid slurry flows past each of the wet zone, the intermediate zone and the dry zone, wherein the non-vibrating member is a horizontal bar attached to the dry zone of the mesh.

6. The system of claim 1, wherein the digital imaging device is configured to capture the images over a period of time while the wellbore drilling assembly is drilling the wellbore, wherein the computer system is configured to perform operations comprising:
   receiving the images captured by the digital imaging device over the period of time;
   after classifying each solid object captured in an image received over the period of time as a drill cutting or as a non-drilled solid, storing the classification of the image with a time instant at which the digital imaging device captured the image; and
   determining an existence of a wellbore condition based on classifications of the images captured over the period of time; and
   modifying a drilling condition operating the wellbore drilling assembly in response to determining the existence of the wellbore condition.

7. The system of claim 6, wherein the wellbore condition is stuck pipe, wherein the computer system is configured to perform operations comprising:
   determining the stuck pipe responsive to identifying an increase in classification of images as non-drilled solids comprising wellbore cavings; and
   modifying a wellbore drilling mud flow rate through the wellbore drilling system responsive to determining the stuck pipe.

8. The system of claim 1, wherein the subterranean zone comprises a formation through which the wellbore is being drilled by the wellbore drilling assembly, wherein a drill cutting comprises a rock separated from the formation in response to a drill bit of the wellbore drilling assembly contacting the formation while drilling the wellbore, wherein the non-drilled solid is any solid object that is not a drill cutting.

9. The system of claim 8, wherein the non-drilled solid comprises at least one of cavings, cement, elastomers or fish eyes.

10. A method comprising:
   receiving, by one or more processors, images captured by a digital imaging device mounted to a non-vibrating member of a shale shaker of a wellbore drilling assembly, the shale shaker positioned at a surface of the Earth adjacent a wellbore and configured to receive a solid slurry comprising a mixture of wellbore drilling mud and solid objects found in the wellbore while drilling the wellbore through a subterranean zone, the solid objects comprising drill cuttings and non-drilled solids, the digital imaging device oriented to face a portion of the shale shaker that receives the solid slurry, the digital imaging device configured to capture digital images of the solid objects while the solid slurry is received by the shale shaker; and
   by implementing image processing techniques on the images:
      classifying, by the one or more processors, a first solid object captured in a first image as a drill cutting, and
      classifying, by the one or more processors, a second solid object captured in a second image as a non-drilled solid,
   wherein implementing the image processing techniques comprises deploying deep learning techniques comprising deploying a convolutional neural network (CNN) model for pattern recognition and image classification of the digital images captured by the digital imaging device, wherein the method further comprises:
      receiving drilling parameters applied to the wellbore drilling assembly to drill the wellbore;
      applying the received drilling parameters as inputs to the CNN model, wherein the drilling parameters comprise a rate of penetration, a weight on bit, and wellbore drilling mud flow rate; and
      deploying the CNN model including the received drilling parameters as inputs for the pattern recognition and the image classification of the digital images.

11. The method of claim 10, wherein an image of a solid object comprises a plurality of particles including particles representing the solid object in a first color and particles representing remaining portions of the image in a second color different from the first, wherein, to implement the image processing techniques, the method comprising:
   counting a number of particles in the image;
   identifying the particles representing the solid object, wherein the particles representing the solid object define an area representing dimensions of the solid object;
   determining a long axis of the area;
   determining a short axis of the area, the short axis being perpendicular to the long axis; and
   determining the dimensions of the solid object based, in part, on a length of the long axis and a length of the short axis.

12. The method of claim 11 comprising:
   storing dimensions of known drill cuttings and known non-drilled solids;
   comparing the dimensions of the solid object with the stored dimensions; and
   identifying the solid object as a drill cutting or a non-drilled solid based on a result of the comparing.

13. The method of claim 10 comprising:
receiving drill bit parameters of the drill bit of the wellbore drilling assembly, the drill bit parameters comprising a number of blades on the drill bit, a type of the drill bit and a size of the drill bit;
receiving wellbore drilling mud parameters of the wellbore drilling mud, the wellbore drilling mud parameters comprising mud weight, a mud type comprising an oil-based mud type or a water-based mud type, and rheological properties of the wellbore drilling mud;
applying the received drill bit parameters and the received wellbore drilling mud parameters as inputs to the CNN model; and
deploying the CNN model including the received drill bit parameters and the received wellbore drilling mud parameters as inputs for the pattern recognition and the image classification of the digital images.

14. The method of claim 10, wherein the digital imaging device is configured to capture the images over a period of time while the wellbore drilling assembly is drilling the wellbore, wherein the method comprising:
receiving the images captured by the digital imaging device over the period of time;
after classifying each solid object captured in an image received over the period of time as a drill cutting or as a non-drilled solid, storing the classification of the image with a time instant at which the digital imaging device captured the image; and
determining an existence of a wellbore condition based on classifications of the images captured over the period of time; and
modifying a drilling condition operating the wellbore drilling assembly in response to determining the existence of the wellbore condition.

15. A non-transitory computer-readable medium storing instructions executable by one or more processors to perform operations comprising:
receiving images captured by a digital imaging device mounted to a non-vibrating member of a shale shaker of a wellbore drilling assembly, the shale shaker positioned at a surface of the Earth adjacent a wellbore and configured to receive a solid slurry comprising a mixture of wellbore drilling mud and solid objects found in the wellbore while drilling the wellbore through a subterranean zone, the solid objects comprising drill cuttings and non-drilled solids, the digital imaging device oriented to face a portion of the shale shaker that receives the solid slurry, the digital imaging device configured to capture digital images of the solid objects while the solid slurry is received by the shale shaker; and
by implementing image processing techniques on the images:
classifying a first solid object captured in a first image as a drill cutting, and
classifying a second solid object captured in a second image as a non-drilled solid,
wherein implementing the image processing techniques comprises deploying deep learning techniques comprising deploying a convolutional neural network (CNN) model for pattern recognition and image classification of the digital images captured by the digital imaging device, wherein the operations further comprise:
receiving drilling parameters applied to the wellbore drilling assembly to drill the wellbore;
applying the received drilling parameters as inputs to the CNN model, wherein the drilling parameters comprise a rate of penetration, a weight on bit, and wellbore drilling mud flow rate; and
deploying the CNN model including the received drilling parameters as inputs for the pattern recognition and the image classification of the digital images.

16. The medium of claim 15, wherein the digital imaging device is configured to capture the images over a period of time while the wellbore drilling assembly is drilling the wellbore, wherein the operations comprising:
receiving the images captured by the digital imaging device over the period of time;
after classifying each solid object captured in an image received over the period of time as a drill cutting or as a non-drilled solid, storing the classification of the image with a time instant at which the digital imaging device captured the image; and
determining an existence of a wellbore condition based on classifications of the images captured over the period of time; and
modifying a drilling condition operating the wellbore drilling assembly in response to determining the existence of the wellbore condition.

* * * * *

UNITED STATES PATENT AND TRADEMARK OFFICE
CERTIFICATE OF CORRECTION

PATENT NO. : 11,719,089 B2
APPLICATION NO. : 16/930014
DATED : August 8, 2023
INVENTOR(S) : Michael Affleck et al.

Page 1 of 1

It is certified that error appears in the above-identified patent and that said Letters Patent is hereby corrected as shown below:

In the Claims

Column 24, Line 17, Claim 15, please replace "ima e s" with -- images --.

Signed and Sealed this
Fifth Day of December, 2023

Katherine Kelly Vidal
*Director of the United States Patent and Trademark Office*